US012348559B2

(12) United States Patent
Xu et al.

(10) Patent No.: US 12,348,559 B2
(45) Date of Patent: Jul. 1, 2025

(54) ACCOUNT CLASSIFICATION USING A TRAINED MODEL AND SIGN-IN DATA

(71) Applicant: Microsoft Technology Licensing, LLC, Redmond, WA (US)

(72) Inventors: Ye Xu, Kirkland, WA (US); Etan Micah Basseri, Seattle, WA (US); Biying Tan, Bellevue, WA (US); Caroline Katherine Templeton, Seattle, WA (US); Prithviraj Sanjeev Kanherkar, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 302 days.

(21) Appl. No.: 17/557,254

(22) Filed: Dec. 21, 2021

(65) Prior Publication Data
US 2023/0199025 A1    Jun. 22, 2023

(51) Int. Cl.
*H04L 9/00* (2022.01)
*G06N 5/01* (2023.01)
(Continued)

(52) U.S. Cl.
CPC ........... *H04L 63/1483* (2013.01); *G06N 5/01* (2023.01); *G06N 20/00* (2019.01);
(Continued)

(58) Field of Classification Search
CPC ............. H04L 63/1483; H04L 63/0861; H04L 63/0869; H04L 63/1425; G06N 5/01;
(Continued)

(56) References Cited

U.S. PATENT DOCUMENTS

2015/0213251 A1* 7/2015 Turgeman ............ H04W 12/06
                                                                 726/7
2016/0180068 A1* 6/2016 Das ..................... H04L 63/0861
                                                                 726/7
(Continued)

FOREIGN PATENT DOCUMENTS

EP          3580677 A1    12/2019
WO       2020032919 A1     2/2020

OTHER PUBLICATIONS

"Application as Filed in U.S. Appl. No. 17/112,780", filed Dec. 4, 2020, 63 Pages.
(Continued)

*Primary Examiner* — Syed M Ahsan
(74) *Attorney, Agent, or Firm* — Ogilvie Law Firm

(57) ABSTRACT

A trained machine learning model distinguishes between human-driven accounts and machine-driven accounts by performing anomaly detection based on sign-in data and optionally also based on directory data. This machine versus human distinction supports security improvements that apply security controls and other risk management tools and techniques which are specifically tailored to the kind of account being secured. Formulation heuristics can improve account classification accuracy by supplementing a machine learning model anomaly detection result, e.g., based on directory information, kind of IP address, kind of authentication, or various sign-in source characteristics. Machine-driven accounts masquerading as human-driven may be identified as machine-driven. Reviewed classifications may serve as feedback to improve the model's accuracy. A precursor machine learning model may generate training data for training a production account classification machine learning model.

20 Claims, 3 Drawing Sheets

(51) Int. Cl.
*G06N 20/00* (2019.01)
*H04L 9/40* (2022.01)

(52) U.S. Cl.
CPC ...... *H04L 63/0861* (2013.01); *H04L 63/0869* (2013.01); *H04L 63/1425* (2013.01)

(58) Field of Classification Search
CPC . G06N 20/00; G06F 2221/2133; G06F 21/30; G06F 21/55
See application file for complete search history.

(56) References Cited

U.S. PATENT DOCUMENTS

| | | | |
|---|---|---|---|
| 2016/0315948 A1 | 10/2016 | Wan et al. | |
| 2019/0044965 A1* | 2/2019 | Pilkington | .......... H04L 63/1416 |
| 2021/0157945 A1* | 5/2021 | Cobb | ...................... G06F 21/32 |

OTHER PUBLICATIONS

"User Account Provisioning", retrieved from <<https://www.techopedia.com/definition/13703/user-account-provisioning>>, Feb. 16, 2017, 9 pages.
"What is the difference between user and service account?", retrieved from <<https://newbedev.com/what-is-the-difference-between-user-and-service-account>>, no later than Oct. 20, 2021, 5 pages.
Alex Leemon, "How to Manage and Secure Service Accounts: Best Practices", retrieved from <<https://www.beyondtrust.com/blog/entry/how-to-manage-and-secure-service-accounts-best-practices>>, Feb. 25, 2021, 13 pages.
Noam Biran, "Service Accounts 101: Learn How to Get Control Over Highly-Privileged Service Accounts", retrieved from <<https://www.authomize.com/blog/service-accounts-101-learn-how-to-get-control-over-highly-privileged-service-accounts/>>, Jun. 7, 2020, 9 pages.
Joseph Carson, "Service Account 201: Service Accounts in the Cloud", retrieved from <<https://thycotic.com/company/blog/2019/11/12/service-accounts-in-the-cloud/>>, Nov. 12, 2019, 8 pages.
"Random forest", retrieved from <<https://en.wikipedia.org/wiki/Random_forest>>, Sep. 13, 2021, 12 pages.
"Isolation forest", retrieved from <<https://en.wikipedia.org/wiki/Isolation_forest>>, Sep. 16, 2021, 7 pages.
Kathrin Melcher, et al., "Fraud Detection Using Random Forest, Neural Autoencoder, and Isolation Forest Techniques", retrieved from <<https://www.infoq.com/articles/fraud-detection-random-forest/>>, Aug. 14, 2019, 17 pages.
"Machine learning", retrieved from <<https://en.wikipedia.org/wiki/Machine_learning>>, Nov. 4, 2021, 27 pages.
"Securing Service Accounts", retrieved from <<https://www.silverfort.com/use-cases/securing-service-accounts/>>, no later than Nov. 14, 2021, 4 pages.
"Introduction to Active Directory service accounts", retrieved from <<https://docs.microsoft.com/en-us/azure/active-directory/fundamentals/service-accounts-on-premises>>, Apr. 28, 2021, 6 pages.
"Service accounts", retrieved from <<https://cloud.google.com/iam/docs/service-accounts>>, Nov. 9, 2021, 13 pages.
Sarah Shelton, et al., "Best Internet Service Providers of 2021", retrieved from <<https://www.usnews.com/360-reviews/internet-providers>>, Oct. 18, 2021, 29 pages.
"Turing test", retrieved from <<https://en.wikipedia.org/wiki/Turing_test>>, Oct. 20, 2021, 26 pages.
"Anomaly detection", retrieved from <<https://en.wikipedia.org/wiki/Anomaly_detection>>, Oct. 31, 2021, 7 pages.
"Mobile device management", retrieved from <<https://en.wikipedia.org/wiki/Mobile_device_management>>, Aug. 18, 2021, 6 pages.
"International Search Report and Written Opinion Issued in PCT Application No. PCT/US22/050981", Mailed Date: Apr. 3, 2023, 10 Pages.

* cited by examiner

ASPECTS OF SOME MODELS 224 OR MODEL FEATURES 314

| AUTONOMOUS SYSTEM 402 NUMBER 404 | ATTEMPT SOURCE 406 |

IP KIND 408 INDICATION 410: HOSTED 412 OR RESIDENTIAL 414

| OPERATING SYSTEM 120 ID 416, COUNT 418 | MANAGED DEVICE 420 |

| USER AGENT 422 | MOBILE DEVICE 424 | COMMAND LINE INTERPRETER 426 |

| BIOMETRIC AUTHENTICATION 428 | MULTIFACTOR AUTHENTICATION 430 |

| HARDWARE SECURITY KEY 432 | ERROR CODE 434 | RANDOM FOREST 436 |

| CREDENTIAL 438 TYPE 440, E.G., PASSWORD 442 | ISOLATION FOREST 444 |

| INDICATION 446 | PERIOD 448 | TIMESTAMP 450 VARIATION 452 |

| (UN)LABELED TRAINING DATA (454) 456 | ACTIVE DAYS 458 INDICATION 460 |

DIRECTORY 462 ENTRY 464: CONTACT INFO 466, EMPLOYEE INFO 468

| ATTEMPT CONSISTENCY MEASURE 470 | SESSION 472 LENGTH 474 |

| SIGN-IN ATTEMPT SUCCESS MEASURE 476 | RESOURCE 478 COUNT 480 |

| INTERNET PROTOCOL ADDRESS 482 | FEEDBACK 492 | THRESHOLD 484 |

| METADATA 486 | ACCESS RIGHTS 490 | NAMING CONVENTION 488 |

Fig. 4

ACCOUNT CLASSIFICATION USING A TRAINED MODEL AND SIGN-IN DATA

BACKGROUND

Attacks on computing systems take many different forms, including some forms which are difficult to predict, and forms which may vary from one situation to another. Accordingly, one of the guiding principles of cybersecurity is "defense in depth". In practice, defense in depth is often pursed by forcing attackers to encounter multiple different kinds of security mechanisms at multiple different locations around or within a computing system. No single security mechanism is able to detect every kind of cyberattack, or able to end every detected cyberattack. But sometimes combining and layering a sufficient number and variety of defenses will deter an attacker, or at least limit the scope of harm from an attack.

To implement defense in depth, cybersecurity professionals consider the different kinds of attacks that could be made. They select defenses based on criteria such as: which attacks are most likely to occur, which attacks are most likely to succeed, which attacks are most harmful if successful, which defenses are in place, which defenses could be put in place, and the costs and procedural changes and training involved in putting a particular defense in place. Some defenses might not be feasible or cost-effective in a given environment. However, improvements in cybersecurity remain possible, and worth pursuing.

SUMMARY

Machine learning models tailored for account classification help distinguish machine-driven accounts from human-driven accounts. This distinction supports security improvements that apply risk management tools and techniques specifically tailored to the kind of account being secured. A human-driven account in a computing system is principally or solely employed to provide a human user with access to digital resources. A machine-driven account, by contrast, is employed principally or solely to provide a software service with access to digital resources. Each kind of account has different cybersecurity characteristics, so an environment may improve security by applying human-driven account tools and policies to human-driven accounts and applying machine-driven account tools and policies to machine-driven accounts.

Some embodiments described herein utilize a machine learning model that is trained to distinguish between human-driven accounts and machine-driven accounts by performing anomaly detection based on sign-in data. Particular machine learning model algorithms and model data features are discussed, along with other data that can supplement a machine learning model anomaly detection result. Other aspects of account classification functionality are also described herein, including for example usage of a precursor machine learning model, and some risk characteristics of different kinds of accounts.

Other technical activities and characteristics pertinent to teachings herein will also become apparent to those of skill in the art. The examples given are merely illustrative. This Summary is not intended to identify key features or essential features of the claimed subject matter, nor is it intended to be used to limit the scope of the claimed subject matter. Rather, this Summary is provided to introduce—in a simplified form—some technical concepts that are further described below in the Detailed Description. The innovation is defined with claims as properly understood, and to the extent this Summary conflicts with the claims, the claims should prevail.

DESCRIPTION OF THE DRAWINGS

A more particular description will be given with reference to the attached drawings. These drawings only illustrate selected aspects and thus do not fully determine coverage or scope.

FIG. 4 is a block diagram illustrating aspects of features or algorithms used within or by some account classification machine learning models;

DETAILED DESCRIPTION

Overview

Figure 1:
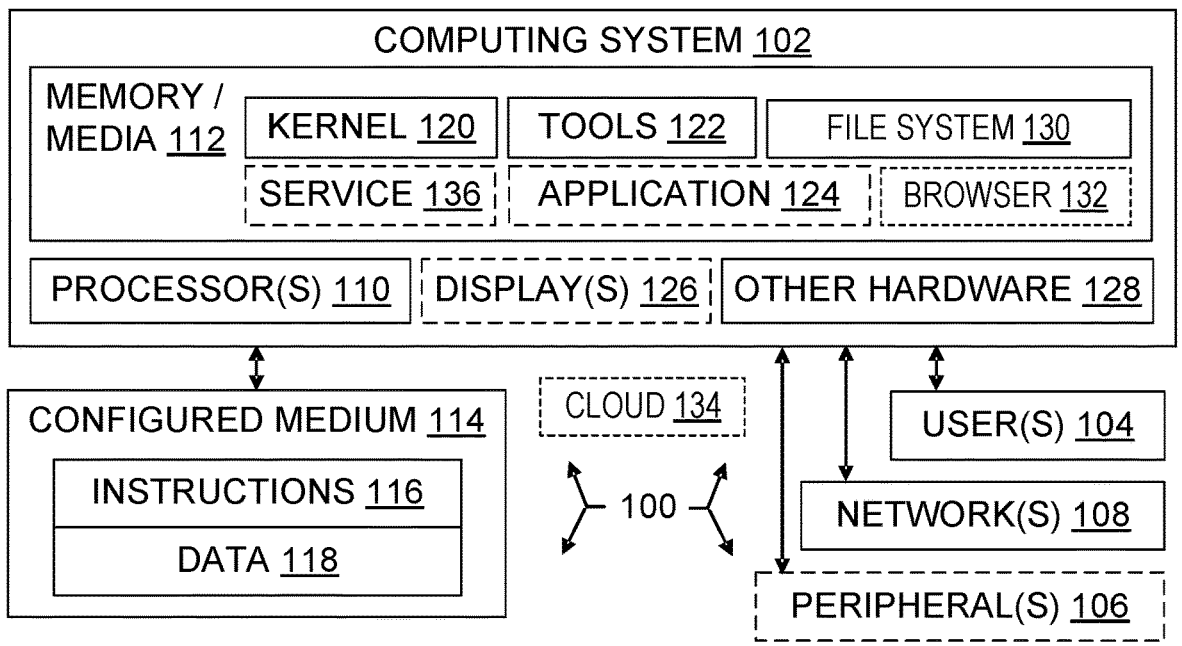
FIG. 1 is a block diagram illustrating computer systems generally and also illustrating configured storage media generally.

Innovations may expand beyond their origins, but understanding an innovation's origins can help one more fully appreciate the innovation. In the present case, some teachings described herein were motivated by Microsoft innovators who recognized and faced technical challenges arising from their efforts to make Azure® clouds and other computing environments more secure (mark of Microsoft Corporation). In particular, the innovators considered and investigated compromise in computing environments.

Compromise involves a lack of legitimate authority. More precisely, as used herein "compromise" refers to the compromise of a computing system account or a digital identity or a computing system account credential, or a combination thereof. In addition, "compromise" refers to the apparent, likely, or actual use of the compromised item by a person or a service (or both) that lacks legitimate authority for that use. Legitimacy is determined under applicable policies, regulations, and laws.

The innovators observed that service principal account security was insufficiently addressed, and decided that security investments dedicated to service principals and other service accounts could help provide parity with user account security. Service account security is sometimes bundled together with human user account security by tools such as intrusion detection systems, intrusion protection systems, and compromise recovery tools. User accounts are also referred to herein as "user identity accounts" or "human user accounts". After thought and investigation, the innovators concluded that this bundling of human and non-human accounts provided an opportunity to improve service principal account security and availability, by unbundling the two kinds of accounts so that service principal accounts and human user accounts are treated differently in certain ways.

Some of the many examples of human-driven accounts include personal accounts created by respective individuals at a social networking website or a video gaming website, accounts assigned to respective employees of an organization or students at a learning institution, and accounts used by individuals to access cloud-based personal productivity software. Some of the many examples of machine-driven accounts include service principals, service accounts, other application identity accounts, and accounts which are nominally provisioned as human user accounts but are used in practice as service accounts.

Sometimes an account is explicitly categorized as either human-driven or machine-driven when the account is created. An administrator might flag an account as a service account, or as a human user account, in the account's properties or metadata. But such flagging is not done consistently, and could be erroneous.

In the absence of consistent and reliable flagging, potential distinctions between human-driven accounts and machine-driven accounts are often blurred. Machine-driven bots routinely attempt to imitate human behavior, notably on social media. Moreover, the username on an account does not necessarily indicate definitively whether the account is human-driven or machine-driven, e.g., without more information it is unclear whether a username like "nanibit01901" or "21kaneis" represents a person or a service.

Service accounts are also sometimes provisioned using the same administrative processes, account properties, access permissions, and namespace as human user accounts. Indeed, the innovators concluded that non-human service accounts have proliferated without adequate security and governance measures being applied to them. A number of cloud service provider customers provision non-human service accounts as human user accounts, which makes those service accounts harder to identify and secure. This conflation may occur because of a technical requirement, or it may arise from a lack of knowledge about better options such as service principals or managed identities. Some of these nominally human user accounts cannot be migrated to accurate service principals or managed identities due to technical constraints.

The innovators concluded that identifying non-human service accounts reliably, consistently, broadly, and efficiently would aid in securing such accounts. The innovators saw opportunities for improvement in account security, and in technology for identifying service accounts. Workarounds, such as asking administrators to flag accounts when they are created, are custom-built and brittle, which tends to make them unreliable, inconsistent, and narrow in their coverage of the accounts present in a given environment.

Service principals and other machine-driven accounts exhibit different cybersecurity characteristics than human-driven accounts in various ways.

One difference involves over-privilege: machine-driven accounts which are provisioned as user accounts may have unnecessary privileges, which increases security risk. Because just-in-time access is rarely implemented for machine-driven accounts, those accounts may have a high level of standing permissions. For example, a machine-driven account might have an admin role which it only exercises occasionally.

Another difference involves lifecycle management: machine-driven accounts may not be subject to rigorous re-attestation and lifecycle management procedures that apply to human user accounts. As a result, machine-driven accounts may have privileges they no longer need, or may continue to exist after they are no longer needed. Admins often "set and forget" these accounts. For example, a machine-driven application identity account might be provisioned with the intent that it run for twelve months only, but due to staffing changes no one remembers to retire the application identity or revoke its privileges.

Another difference involves credential strength: some machine-driven accounts cannot rely on relatively strong authentication using human action, e.g., Fast Identity Online (FIDO), biometric, or multifactor authentication. Some machine-driven accounts cannot rely on X.509 certificates. Accordingly, some machine-driven accounts rely on a password alone, which is relatively weak compared to the security measures employed with many human-driven accounts.

Another difference involves availability and access control: an authentication tool can challenge a risky user account sign-in by requiring multifactor authentication (MFA) as a condition of access. But requiring MFA for access to a machine-driven account may break a service. Accordingly, machine-driven accounts are excluded from access control policies (e.g., Conditional Access) that require MFA. A result is that some risky accounts will be allowed to access resources without satisfying an MFA requirement.

As an example, consider a scenario in which an account is flagged as compromised, and the authentication requirements for the account are increased, e.g., by requiring a multifactor authentication (MFA) that was not previously required. For a human-driven user account, this approach makes sense, and it helps protect the account with very little inconvenience to the account's legitimate human user and little if any impact on other people or on their accounts. If a password that was previously sufficient by itself to access the user account must now be supplemented by a biometric credential or a removable hardware key or a one-time passcode sent to a smartphone, for example, then the user account's security is increased with little inconvenience for the person who owns the account and no direct impact on anyone else.

But what if the account is not a human-driven account? Even if it was nominally provisioned as a user account, the account might be machine-driven in practice. If the account is machine-driven, then any service that relies on the account to operate will very likely be degraded or broken entirely by the newly imposed multifactor authentication requirement. Thus, failing to distinguish fully between machine-driven accounts and human-driven accounts increases the risk that a service will be made unavailable, despite efforts to secure all of the accounts in the environment, or even in some cases as an inadvertent result of such efforts.

The innovators also identified other differences between human-driven accounts and machine-driven accounts that can impact security. For example, it turns out that the data features most helpful in identifying an application identity account compromise differ somewhat from the data features being utilized to identify user account compromise. Also, application identity account compromise detection benefits from a per-credential analysis that is not applicable to human-driven user accounts. This stems from the fact that user accounts generally have a single credential (e.g., a password) or a single set of related credentials (e.g., a password supplemented by MFA), whereas application identity accounts sometimes have multiple credentials that are independent of one another.

Accordingly, a set of technical challenges arose, involving the similarities and differences between machine-driven accounts and human-driven accounts with respect to compromise in particular and security in general. One may view these as challenges arising from this initial technical question: How may cybersecurity be improved based on distinctions between machine-driven accounts and human-driven accounts?

One constituent technical challenge is to determine at least some of the relevant distinctions between machine-driven accounts and human-driven accounts, in order to automatically classify a given account as being either machine-driven or human-driven. Some embodiments address this challenge in one or more of the following ways: tailoring a machine learning anomaly detector with features chosen specifically for account classification, and supplementing the anomaly detection result with other signals such as directory content or browser usage.

Another constituent challenge is how to increase the efficiency and accuracy of account classification mechanisms. Some embodiments address this challenge by using a trained machine learning model to tag service accounts and other machine-driven accounts. The sign-in behavior for machine-driven accounts differs from the sign-in behavior for human-driven accounts as to particular model features discussed herein, allowing differentiation of accounts by a suitably trained and signaled anomaly detection system. Some embodiments supplement the machine learning-based anomaly detection by other tests, e.g., a machine-driven account may lack directory content such as employee info or contact info, and a legitimate machine-driven account would not typically use a Tor™ browser (mark of The Tor Project, Inc.) or other anonymity mechanism.

Account classification tagging may be triggered in some computing environments by user object properties and by sign-in patterns, for example. Some risk management mechanisms submit these account classification tags to a human admin for review. Thus, admins can categorize accounts correctly, even if the user object remains unchanged, e.g., a nominal user account may be tagged as actually being a service account. Admins may confirm or deny model-generated tags. One prototype classifier created by the innovators provided 88% precision. The admin's confirm/deny action may generate feedback to enrich the classification tool. Once service accounts are tagged, admins can subject these accounts to suitable capabilities, e.g., capabilities provided for service principals in Conditional Access, Identity Protection and Identity Governance, or similar functionality in non-Microsoft environments.

More generally, the present disclosure provides answers to these questions and technical mechanisms to address these challenges, in the form of account classification functionalities that distinguish between machine-driven accounts and human-driven accounts. These functionalities are not strictly limited to classification alone, e.g., they may guide post-classification actions or facilitate classification breadth, effectiveness, or efficiency, but they include, facilitate, or arise from classification activities. These functionalities may be used in various combinations with one another, or alone, in a given embodiment.

Operating Environments

With reference to FIG. 1, an operating environment 100 for an embodiment includes at least one computer system 102. The computer system 102 may be a multiprocessor computer system, or not. An operating environment may include one or more machines in a given computer system, which may be clustered, client-server networked, and/or peer-to-peer networked within a cloud 134. An individual machine is a computer system, and a network or other group of cooperating machines is also a computer system. A given computer system 102 may be configured for end-users, e.g., with applications, for administrators, as a server, as a distributed processing node, and/or in other ways.

Human users 104 may interact with the computer system 102 by using displays, keyboards, and other peripherals 106, via typed text, touch, voice, movement, computer vision, gestures, and/or other forms of I/O. A screen 126 may be a removable peripheral 106 or may be an integral part of the system 102. A user interface may support interaction between an embodiment and one or more human users. A user interface may include a command line interface, a graphical user interface (GUI), natural user interface (NUI), voice command interface, and/or other user interface (UI) presentations, which may be presented as distinct options or may be integrated.

System administrators, network administrators, cloud administrators, security analysts and other security personnel, operations personnel, developers, testers, engineers, auditors, and end-users are each a particular type of human user 104. Automated agents, scripts, playback software, devices, and the like running or otherwise serving on behalf of one or more humans may also have accounts, e.g., application identity accounts. Sometimes an account is created or otherwise provisioned as a human user account but in practice is used primarily or solely by one or more services 136; as a result, this is a de facto application identity account, which is an example of a machine-driven account. Use of a de facto application identity account by a human is typically limited to (re)configuring the account or to similar administrative or security use.

Storage devices and/or networking devices may be considered peripheral equipment in some embodiments and part of a system 102 in other embodiments, depending on their detachability from the processor 110. Other computer systems not shown in FIG. 1 may interact in technological ways with the computer system 102 or with another system embodiment using one or more connections to a network 108 via network interface equipment, for example.

Each computer system 102 includes at least one processor 110. The computer system 102, like other suitable systems, also includes one or more computer-readable storage media 112, also referred to as computer-readable storage devices 112. Documents and other files 130 may reside in media 112. Storage media 112 may be of different physical types. The storage media 112 may be volatile memory, nonvolatile memory, fixed in place media, removable media, magnetic media, optical media, solid-state media, and/or of other types of physical durable storage media (as opposed to merely a propagated signal or mere energy). In particular, a configured storage medium 114 such as a portable (i.e., external) hard drive, CD, DVD, memory stick, or other removable nonvolatile memory medium may become functionally a technological part of the computer system when inserted or otherwise installed, making its content accessible for interaction with and use by processor 110. The removable configured storage medium 114 is an example of a computer-readable storage medium 112. Some other examples of computer-readable storage media 112 include built-in RAM, ROM, hard disks, and other memory storage devices which are not readily removable by users 104. For compliance with current United States patent requirements, neither a computer-readable medium nor a computer-readable storage medium nor a computer-readable memory is a signal per se or mere energy under any claim pending or granted in the United States.

The storage device 114 is configured with binary instructions 116 that are executable by a processor 110; "executable" is used in a broad sense herein to include machine code, interpretable code, bytecode, and/or code that runs on a virtual machine, for example. The storage medium 114 is also configured with data 118 which is created, modified, referenced, and/or otherwise used for technical effect by execution of the instructions 116. The instructions 116 and the data 118 configure the memory or other storage medium 114 in which they reside; when that memory or other computer readable storage medium is a functional part of a given computer system, the instructions 116 and data 118 also configure that computer system. In some embodiments, a portion of the data 118 is representative of real-world items such as product characteristics, inventories, physical measurements, settings, images, readings, targets, volumes, and so forth. Such data is also transformed by backup, restore, commits, aborts, reformatting, and/or other technical operations.

Although an embodiment may be described as being implemented as software instructions executed by one or more processors in a computing device (e.g., general purpose computer, server, or cluster), such description is not meant to exhaust all possible embodiments. One of skill will understand that the same or similar functionality can also often be implemented, in whole or in part, directly in hardware logic, to provide the same or similar technical effects. Alternatively, or in addition to software implementation, the technical functionality described herein can be performed, at least in part, by one or more hardware logic components. For example, and without excluding other implementations, an embodiment may include hardware logic components 110, 128 such as Field-Programmable Gate Arrays (FPGAs), Application-Specific Integrated Circuits (ASICs), Application-Specific Standard Products (ASSPs), System-on-a-Chip components (SOCs), Complex Programmable Logic Devices (CPLDs), and similar components. Components of an embodiment may be grouped into interacting functional modules based on their inputs, outputs, and/or their technical effects, for example.

In addition to processors 110 (e.g., CPUs, ALUs, FPUs, TPUs and/or GPUs), memory/storage media 112, and displays 126, an operating environment may also include other hardware 128, such as batteries, buses, power supplies, wired and wireless network interface cards, for instance. The nouns "screen" and "display" are used interchangeably herein. A display 126 may include one or more touch screens, screens responsive to input from a pen or tablet, or screens which operate solely for output. In some embodiments, peripherals 106 such as human user I/O devices (screen, keyboard, mouse, tablet, microphone, speaker, motion sensor, etc.) will be present in operable communication with one or more processors 110 and memory.

In some embodiments, the system includes multiple computers connected by a wired and/or wireless network 108. Networking interface equipment 128 can provide access to networks 108, using network components such as a packet-switched network interface card, a wireless transceiver, or a telephone network interface, for example, which may be present in a given computer system. Virtualizations of networking interface equipment and other network components such as switches or routers or firewalls may also be present, e.g., in a software-defined network or a sandboxed or other secure cloud computing environment. In some embodiments, one or more computers are partially or fully "air gapped" by reason of being disconnected or only intermittently connected to another networked device or remote cloud. In particular, account classification functionality could be installed on an air gapped network and then be updated periodically or on occasion using removable media.

A given embodiment may also communicate technical data and/or technical instructions through direct memory access, removable nonvolatile storage media, or other information storage-retrieval and/or transmission approaches.

One of skill will appreciate that the foregoing aspects and other aspects presented herein under "Operating Environments" may form part of a given embodiment. This document's headings are not intended to provide a strict classification of features into embodiment and non-embodiment feature sets.

One or more items are shown in outline form in the Figures, or listed inside parentheses, to emphasize that they are not necessarily part of the illustrated operating environment or all embodiments, but may interoperate with items in the operating environment or some embodiments as discussed herein. It does not follow that any items which are not in outline or parenthetical form are necessarily required, in any Figure or any embodiment. In particular, FIG. 1 is provided for convenience, inclusion of an item in FIG. 1 does not imply that the item, or the described use of the item, was known prior to the current innovations.

More About Systems

Figure 2:
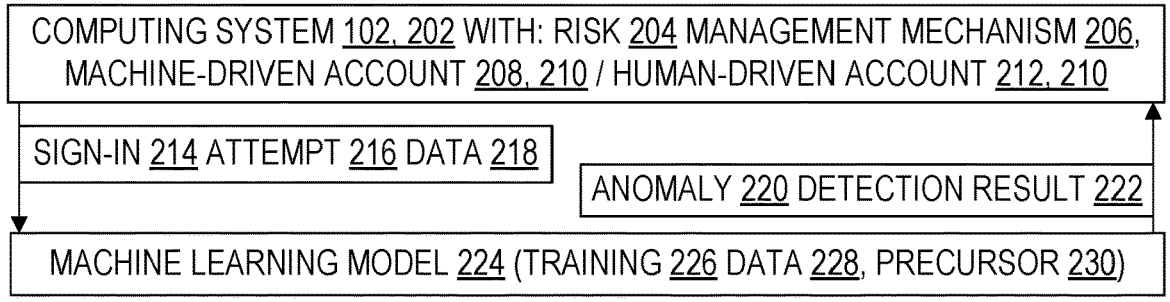
FIG. 2 is a block diagram illustrating aspects of a computing system which has one or more of the account classification enhancements taught herein.

FIG. 2 illustrates a computing system 102 configured by one or more of the account classification enhancements taught herein, resulting in an enhanced system 202. This enhanced system 202 may include a single machine, a local network of machines, machines in a particular building, machines used by a particular entity, machines in a particular datacenter, machines in a particular cloud, or another computing environment 100 that is suitably enhanced. In some embodiments the enhanced system 202 may be networked through an interface 318. An interface 318 may include hardware such as network interface cards, software such as network stacks, APIs, or sockets, combination items such as network connections, or a combination thereof.

FIG. 2 is not a comprehensive summary of all enhanced systems 202. FIG. 2 items are discussed at various points herein, and additional details regarding them are provided in the discussion of a List of Reference Numerals later in this disclosure document.

Figure 3:
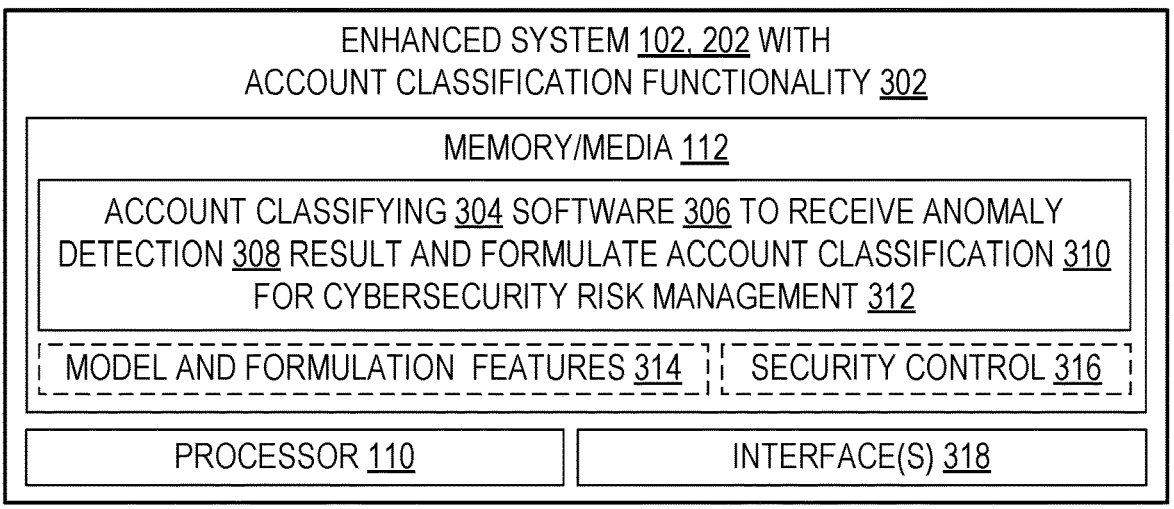
FIG. 3 is a block diagram illustrating an enhanced system configured with account classification functionality.

FIG. 3 illustrates an enhanced system 202 which is configured with software 306 to provide account classification functionality 302. This is not a comprehensive summary of all enhanced systems 202. FIG. 3 items are discussed at various points herein, and additional details regarding them are provided in the discussion of a List of Reference Numerals later in this disclosure document.

FIG. 4 shows some aspects of machine learning models 224 or machine learning and formulation features 314. This is not a comprehensive summary of all models 224 or of every model 224 data feature 314 or every formulation 506 data feature 314. FIG. 4 items are discussed at various points herein, and additional details regarding them are provided in the discussion of a List of Reference Numerals later in this disclosure document.

In some embodiments, the enhanced system 202 submits sign-in data 218 to a trained machine learning (ML) model 224, gets an anomaly detection result 222 from the trained ML model, forms an account classification 310 using the anomaly detection result, and supplies the account classification to a cybersecurity risk management mechanism 206.

In some embodiments, the enhanced system 202 is configured to classify 304 an account 210 in a computing environment 100 as machine-driven 208 or as human-driven 212. In some cases, the account 210 is provisioned 602 as human-driven but is not necessarily human-driven in operation. The enhanced system 202 includes a digital memory 112 and a processor 110 in operable communication with the memory. The digital memory 112 may be volatile or non-volatile or a mix. The processor 110 is configured to perform account classification steps 600. The steps include (a) submitting 502 sign-in data 218 to a trained machine learning model 224, the sign-in data representing at least one attempt 216 to sign-in 214 to the account 210, the trained machine learning model tailored 226 for account classification by at least one of the following: human-driven account sign-in data 218, 228 which trained 226 the machine learning model to detect 308 machine-driven accounts 208 as anomalies 220, or machine-driven account sign-in data 218, 228 which trained 226 the machine learning model to detect 308 human-driven accounts 212 as anomalies 220, (b) receiving 504 from the trained machine learning model an anomaly detection result 222, (c) formulating 506 an account classification 310 based at least in part on the anomaly detection result, and (d) supplying 508 the account classification for use 510 by a cybersecurity risk management mechanism 206.

The cybersecurity risk management mechanism 206 is configured to manage 510 a cybersecurity risk 204 associated with the account 210 based at least in part on the account classification 310. For example, the mechanism 206 may avoid imposing MFA requirements for access to an account 208, 210 that is classified as machine-driven. As another example, the mechanism 206 may increase the level of detail logged when an account 208, 210 is classified as machine-driven, or may perform logging that would be impermissible under laws or regulations governing human-generated data, or do both. As yet another example, the mechanism 206 may send sign-in data 218 for a machine-driven account 208 to a service account compromise detection mechanism, e.g., one using a different machine learning model which is tailored to detect compromise of machine-driven accounts 208. Sign-in data 218 for a human-driven account 212 could be sent to a compromise detection mechanism which is tailored to detect compromise of human-driven accounts 212. In some scenarios, the computing system facilitates cybersecurity risk management 312 for accounts 208 which were provisioned as human-driven but are actually machine-driven. These are merely some examples, not a summary of all possible ways in which a mechanism 206 may be configured to manage 510 a cybersecurity risk 204 based at least in part on an account classification 310.

Some embodiments communicate with the model 224 but do not themselves include the account classification model 224. Other embodiments do include the trained machine learning-based account classification model 224.

In some embodiments, the trained machine learning model 224 is tailored for account classification by at least a random forest algorithm 436 implementation. Some embodiments use an isolation forest algorithm 444 on unlabeled data 218 to detect an initial small group of machine-driven accounts 208 as anomalies 220, and then these labeled accounts 208 are used as training data 228 to train 226 a random forest classifier 436, 224 to classify accounts 210 as human-driven accounts 212 or machine-driven accounts 208.

In some embodiments, the trained machine learning model 224 is tailored for account classification at least in that the trained machine learning model has been trained 226 and thereby configured using training data 228 which includes, represents, or is a calculation basis of at least a specified number N of the following features 314, with N in the range from two to the total number of features 314 disclosed herein, depending on the embodiment.

One feature 314 is an indication 446 whether an IP address 482 of a source 406 of a sign-in attempt 216 is hosted 412 or residential 414. Hosted IP usage tends to increase a likelihood of the account 210 being a machine-driven account, while use of a residential IP decreases that likelihood (or differently viewed, tends to increase a likelihood of the account 210 being a human-driven account). An exception would be residential IPs commandeered by a botnet.

One feature 314 is an indication 446 whether an autonomous system number 404 of a source 406 of a sign-in attempt 216 represents hosted IPs 412, 482 or residential IPs 414, 482.

One feature 314 is an indication 446 whether a source 406 of a sign-in attempt 216 is a browser 132, e.g., as indicated in a user agent 422. Browser usage tends to increase a likelihood of the account 210 being a human-driven account. An exception would be malicious scripts executed by browsers.

One feature 314 is an indication 446 whether a source 406 of a sign-in attempt 216 is a command line interpreter 426. A CLI 426 may be an alternative to a browser 132. Command line interpreters 426 are more closely associated with server operating systems using scripts and machine-driven accounts than with individual human users using human-driven accounts. An exception would be commands run by admins or developers.

One feature 314 is an indication 446 whether a source 406 of a sign-in attempt 216 resides on a mobile device 424. Mobile device usage tends to increase a likelihood of the account 210 being a human-driven account. An exception would be malware running on a mobile device.

One feature 314 is an indication 446 whether a source 406 of a sign-in attempt 216 resides on an organizationally managed device 420. Managed device usage tends to increase a likelihood of the account 210 being a human-driven account. An exception would be malware running on a managed device.

One feature 314 is an indication 446 whether a sign-in attempt 216 included or followed a successful multifactor authentication 430. MFA usage tends to greatly increase a likelihood of the account 210 being a human-driven account. An exception would be malware re-using MFA credentials.

One feature 314 is an indication 446 whether a sign-in attempt 216 included or followed a successful biometric authentication 428. Biometric usage tends to greatly increase a likelihood of the account 210 being a human-driven account. An exception would be malware re-using biometric credentials.

One feature 314 is an indication 446 whether a sign-in attempt 216 included or followed a successful removable hardware security key device 432 authentication. Hardware key 432 usage tends to greatly increase a likelihood of the account 210 being a human-driven account. An exception would be malware re-using hardware security key credentials.

One feature 314 is an indication 446 of which 416 one or more operating systems 120 are present on a source 406 of a sign-in attempt 216. Different operating systems or other kernels sometimes correlate with different respective distributions of machine-driven versus human-driven sign-in attempts.

One feature 314 is an indication 446 of how many 418 operating systems 120 are present on a source 406 of a sign-in attempt 216. More kernels present tends to increase a likelihood of the account 210 being machine-driven, but an exception would be human users on machines that have multiple kernels, e.g., human-driven admin accounts.

One feature 314 is an error code 434, 446 generated in response to the sign-in attempt 216. Different errors 434 may correlate with human activity versus machine activity in some environments.

One feature 314 is a sign-in attempt success measure 476 of a source 406 of a sign-in attempt 216. For instance, a success rate 446, an error code 434, 446, or a retry count 446 may be used as a success measure 476. A machine-driven account sign-in success rate tends to be either 100% or zero, whereas a human-driven account sign-in success rate tends to include values between those two endpoints. Machine-driven sign-ins tend to either succeed or else result in many retry attempts 216, often in rapid succession (faster than human typing speed), while human-driven sign-in attempts tend to either succeed within a few tries or be abandoned after a few tries. So retry counts for machine-driven accounts tend to be either zero or more than a threshold 484, e.g., more than five, whereas retry counts for human-driven accounts tend to be more evenly distributed above zero and under the threshold (e.g., less than five).

One feature 314 is an indication 446 of an extent to which timestamps 450 of respective sign-in attempts vary 452 over a time period 448, e.g., over a period of at least five days. Machine-driven accounts tend to sign-in at the same time each day, whereas human-driven accounts tend to be more varied, even if the human driving the account nominally starts work at the same time each day. An exception would be an injection of sign-in time variation by malware.

One feature 314 is a signed-in duration 446 indicating a length 474 of a session 472 after a successful sign-in attempt. Human-driven accounts tend to have sessions lasting about the length of a common work shift, e.g., about eight hours or about twelve hours, whereas machines are sometimes logged in for more than twelve hours per day. Exceptions include accounts driven by people who work longer shifts, e.g., some medical personnel or first responders.

One feature 314 is an active days 458 indication 460, 446, which indicates on how many consecutive days a successful sign-in attempt occurred, or indicates on which days a successful sign-in attempt occurred, or both. Human-driven accounts may show a workday versus non-workday pattern (e.g., weekends off, or four days on then three days off) that is often not followed by machine-driven accounts. Also, human-driven accounts tend to login perhaps once or twice a day, so a login pattern of once-per-week or less, e.g., monthly logins, tends to indicate a machine-driven account. An exception would be an intermittently used entertainment account, e.g., a video gaming or online gaming account used when the person driving it happens to have some spare time.

One feature 314 is an allocated resources 478 count 480 indicating how many resources are allocated to the account. Machines 102 tend to have a lot more resources than humans 104, e.g., by reason of spinning up virtual machines, creating logs, generating data, capturing data, or performing computations. A resource count 480 may be in terms of discrete resources, e.g., twelve virtual machines, six thousand captured packets, or sixty spawned processes. Instead, or in addition, the resource count 480 may be in terms of allocatable units, e.g., four hundred gigabytes of log data, twelve dedicated GPUs, or seventy megabits per second of network bandwidth.

One feature 314 is an indication 446 whether a directory 462 entry 464 for the account 210 includes contact information 466, e.g., a phone extension or other phone number, or a postal mailing address. Lack of contact information 466 tends to indicate a machine-driven account 208. But contact info 466 could be included for a machine-driven account 208, e.g., as a joke or a default value, or due to a programming oversight.

One feature 314 is an indication 446 whether a directory entry 464 for the account 210 includes employee information 468, e.g., a hire date, a job title, a responsible manager or other supervisor, a department, a citizenship identifier, a salary level, professional certifications, or a military rank. But employee info 468 could be included for a machine-driven account 208, e.g., as a joke or a default value, or due to a programming oversight.

The feature 314 descriptions above, and other parts of the disclosure herein, speak in terms such as "tend to" or a "likelihood" because account 210 classification system 202 embodiments receive and weigh multiple feature values as input signals or as formulation 506 factors (or both). Unless explicitly stated otherwise, embodiments do not merely make simple rule-based classification decisions that fail to consider or weigh different features 314. Simple rules such as "mobile device means human-driven" or "zero retries means machine-driven" are disfavored herein.

Exceptions exist for most if not all of the tendencies and likelihoods discussed herein. However, despite the exceptions, account classification accuracy will often be increased by refining an embodiment to weigh more feature data 314 or different kinds of features 314, or both. Such refinement may be accomplished, e.g., by training 226 the model 224 with more features 314, 228, by providing 502 more features 314 to the trained model as input signals, by utilizing more features 314 during formulation 506, or by a combination of such refinements.

Having said that, some kinds of data 118 are better for training 226, model signaling 502, and classification formulation 506 than other kinds of data. The present disclosure describes model and formulation features 314 which are a subset of the much larger and more diverse data 118 available in a given system 102. Use of data 118 not expressly identified herein as feature 314 data is not inherently prohibited, but feature 314 data is favored for use in account classification 600, 302.

Other system embodiments are also described herein, either directly or derivable as system versions of described processes or configured media, duly informed by the extensive discussion herein of computing hardware.

Although specific account classification system 202 architecture examples are shown in the Figures, an embodiment may depart from those examples. For instance, items shown in different Figures may be included together in an embodiment, items shown in a Figure may be omitted, functionality shown in different items may be combined into fewer items or into a single item, items may be renamed, or items may be connected differently to one another.

Examples are provided in this disclosure to help illustrate aspects of the technology, but the examples given within this document do not describe all of the possible embodiments. A given embodiment may include additional or different features 314 for one or more of submission 502 to a model as sign-in attempt data 218, training 226 the model, or account classification formulation 506. A given embodiment may include additional or different technical features, aspects, mechanisms, operational sequences, data structures, machine learning algorithms, or other account classification functionality teachings noted herein, for instance, and may otherwise depart from the particular illustrative examples provided.

Processes (a.k.a. Methods)

Figure 5:
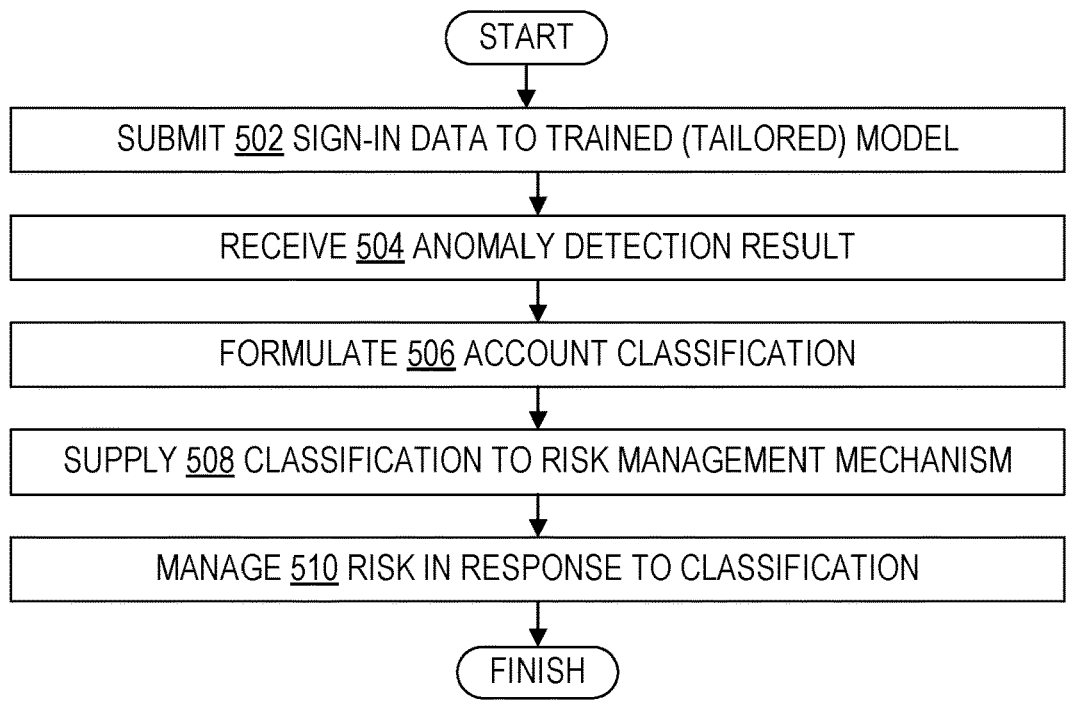
FIG. 5 is a flowchart illustrating steps in some account classification methods.
Figure 6:
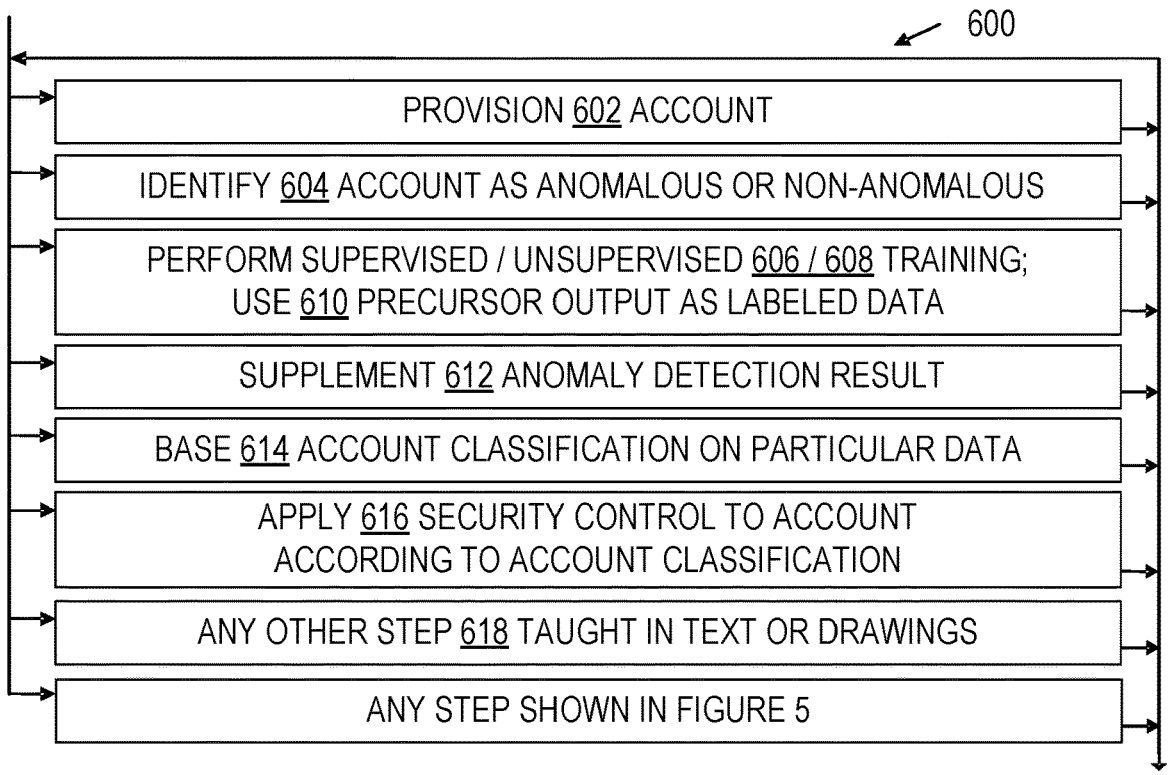
FIG. 6 is a flowchart further illustrating steps in some account classification methods, incorporating FIG. 5.

Methods (which may also be referred to as "processes" in the legal sense of that word) are illustrated in various ways herein, both in text and in drawing figures. FIGS. 5 and 6 illustrate families of methods 500, 600 that may be performed or assisted by an enhanced system, such as system 202 or another functionality 302 enhanced system as taught herein. FIG. 6 includes some refinements, supplements, or contextual actions for steps shown in FIG. 5, and incorporates the steps of FIG. 5 as options.

Technical processes shown in the Figures or otherwise disclosed will be performed automatically, e.g., by an enhanced system 202, unless otherwise indicated. Related processes may also be performed in part automatically and in part manually to the extent action by a human person is implicated, e.g., in some embodiments a human may manually type in a password which then becomes (or is hashed to produce) submitted 502 sign-in data 218. But no process contemplated as innovative herein is entirely manual or purely mental; claimed processes cannot be performed solely in a human mind or on paper.

In a given embodiment zero or more illustrated steps of a process may be repeated, perhaps with different parameters or data to operate on. Steps in an embodiment may also be done in a different order than the top-to-bottom order that is laid out in FIGS. 5 and 6. Arrows in method or data flow figures indicate allowable flows; arrows pointing in more than one direction thus indicate that flow may proceed in more than one direction. Steps may be performed serially, in a partially overlapping manner, or fully in parallel within a given flow. In particular, the order in which flowchart 500 or 600 action items are traversed to indicate the steps performed during a process may vary from one performance of the process to another performance of the process. The flowchart traversal order may also vary from one process embodiment to another process embodiment. Steps may also be omitted, combined, renamed, regrouped, be performed on one or more machines, or otherwise depart from the illustrated flow, provided that the process performed is operable and conforms to at least one claim.

Some embodiments use or provide a method 600 for classifying an account 210 in a computing environment as machine-driven or as human-driven, the method performed by a computing system 202, the method including: submitting 502 sign-in data 218 to a trained machine learning model 224, the sign-in data representing at least one attempt 216 to sign-in to the account 210, the trained machine learning model tailored 226 for account classification 310 by at least one of the following: human-driven account 212 sign-in data 218, 228 which trained the machine learning model to detect machine-driven accounts 208 as anomalies 220, or machine-driven account 208 sign-in data 218, 228 which trained the machine learning model to detect human-driven accounts 212 as anomalies 220; receiving 504 from the trained machine learning model an anomaly detection result 222; formulating 506 an account classification 310 based at least in part on the anomaly detection result 222; and supplying 508 the account classification for use by a cybersecurity risk management mechanism 206, the cybersecurity risk management mechanism configured to manage a cybersecurity risk 204 associated with the account 210 based at least in part on the account classification 310.

In some situations, an embodiment detects a machine-driven account masquerading as a human-driven account. Depending on how the model 224 is trained, this may include a model result 222 indicating an anomaly or a model result 222 indicating a non-anomaly. In some embodiments, the method includes training 226 the machine learning model using human-driven account sign-in data, and the anomaly detection result identifies 604 the account as anomalous 220, and the account classification 310 classifies 304 the account as machine-driven 208 even though the account was provisioned 602 as human-driven 212.

In some embodiments, the method includes training 226 the machine learning model using machine-driven account sign-in data, and the anomaly detection result identifies 604 the account as non-anomalous, and the account classification classifies 304 the account as machine-driven 208 even though the account was provisioned 602 as human-driven 212.

Some embodiments use directory 462 information to supplement the model result 222. In some embodiments, the model 224 was not trained using the directory info, but the model output 222 is combined 506 with directory info to perform account classification 304. In some embodiments, formulating 506 the account classification 310 includes supplementing 612 the anomaly detection result 222 with at least one of the following: an indication 446 whether a directory entry 464 for the account 210 includes contact information 466, or an indication 446 whether a directory entry 464 for the account 210 includes employee information 468.

In some embodiments, submitting 502 sign-in data includes submitting at least an indication 410, 446 whether an IP address 482 of a source 406 of the sign-in attempt 216 is hosted 412 or residential 414. In some embodiments, formulating 506 the account classification 310 includes basing 614 the account classification on at least an indication 410, 446 whether an IP address 482 of a source 406 of the sign-in attempt 216 is hosted 412 or residential 414. Some embodiments do both, by submitting 502 an indication 410 and by formulating 506 the classification 310 based on the indication 410.

In some embodiments, submitting 502 sign-in data includes submitting at least an indication 446, 440 whether the sign-in attempt 216 presented a password 442 as an authentication credential 438. In some embodiments, formulating 506 the account classification 310 includes basing 614 the account classification on at least an indication 446, 440 whether the sign-in attempt 216 presented a password 442 as an authentication credential 438.

Apparent human action (e.g., biometric scan, or insertion of a removable hardware key) may be a particularly helpful signal or factor. In some embodiments, submitting 502 sign-in data includes submitting at least an indication 446 whether the sign-in attempt 216 included or followed a successful biometric authentication 428. In some, submitting 502 sign-in data includes submitting at least an indication 446 whether the sign-in attempt 216 included or followed a successful removable hardware security key device 432 authentication. In some embodiments, formulating 506 the account classification 310 includes basing 614 the account classification on at least an indication 446 whether the sign-in attempt 216 included or followed a successful biometric authentication 428. In some, formulating 506 the account classification 310 includes basing 614 the account classification on at least an indication 446 whether the sign-in attempt 216 included or followed a successful removable hardware security key device 432 authentication.

In some embodiments, submitting 502 sign-in data includes submitting at least an indication 446 whether a source 406 of the sign-in attempt 216 is a browser 132. In some, formulating 506 the account classification 310 includes basing 614 the account classification on at least an indication 446 whether a source 406 of the sign-in attempt 216 is a browser 132.

In some embodiments, submitting 502 sign-in data includes submitting at least a sign-in attempt 216 consistency measure 470. In some, formulating 506 the account classification 310 includes basing 614 the account classification on at least a sign-in attempt 216 consistency measure 470. Consistency 470 may be manifest as an extreme (100% or 0%) login success rate 446, or as the same login time 450 each day, for example.

As noted, one reason to detect machine-driven accounts is so that they are secured differently than human-driven accounts. In some embodiments, the account classification 310 classifies 304 the account as machine-driven 208, and the cybersecurity risk management mechanism 206 applies 616 a different security control 316 to the account than the cybersecurity risk management mechanism applies 616 to human-driven accounts 212. For example, apparent compromises of machine-driven accounts 208 may trigger alerts to people (e.g., admin or security personnel) whereas apparent compromises of human-driven accounts trigger an automatic MFA requirement without immediate notification to a human other than the account's nominal owner.

Some embodiments utilize a model bootstrapping approach, in which an unsupervised model is trained with unlabeled data and then that model's output is used as labeled data to train a supervised model. Some embodiments include training 226 a precursor machine learning model 230 using unlabeled sign-in training data 228 and unsupervised training, e.g., an isolation forest 444 model 230, and then training the trained machine learning model 224, e.g., a random forest 436 model 224, for account classification using supervised training and using output from the precursor machine learning model as labeled training data 228. The data that is used to train 226 a model 224 is not necessarily data that is submitted 502 to the trained model for account classification.

Configured Storage Media

Some embodiments include a configured computer-readable storage medium 112. Storage medium 112 may include disks (magnetic, optical, or otherwise), RAM, EEPROMS or other ROMs, and/or other configurable memory, including in particular computer-readable storage media (which are not mere propagated signals). The storage medium which is configured may be in particular a removable storage medium 114 such as a CD, DVD, or flash memory. A general-purpose memory, which may be removable or not, and may be volatile or not, can be configured into an embodiment using items such as account classification software 306, trained models 224, anomaly detection results 222, features 314, 118, and account classifications 310, in the form of data 118 and instructions 116, read from a removable storage medium 114 and/or another source such as a network connection, to form a configured storage medium. The configured storage medium 112 is capable of causing a computer system 102 to perform technical process steps for account 210 classification 304, as disclosed herein. The Figures thus help illustrate configured storage media embodiments and process (a.k.a. method) embodiments, as well as system and process embodiments. In particular, any of the process steps illustrated in FIG. 5 or 6, or otherwise taught herein, may be used to help configure a storage medium to form a configured storage medium embodiment.

Some embodiments use or provide a computer-readable storage device 112, 114 configured with data 118 and instructions 116 which upon execution by at least one processor 110 cause a computing system to perform a method for classifying an account 210 in a computing environment 100 as machine-driven 208 or as human-driven 212.

In some scenarios, the account 210 is provisioned 602 as human-driven but is not necessarily human-driven in operation, it may instead be machine-driven during at least part of its existence. The account 210 being provisioned 602 as human-driven means, at a minimum, that the account is not flagged or otherwise expressly categorized as machine-driven when the account is created, either in metadata 486 of the account or in any admin tool 122 that is used to create the account. The account may also be provisioned 602 as human-driven in one or more of the following ways: the same naming conventions 488 are followed by the account 210 and by a set of human user accounts 212, the same access rights (a.k.a. privileges or permissions) 490 are given to the account 210 and to at least one human user account, the same security administration procedures are applied to the account 210 and to a set of human user accounts, the only kind of identity management data structure value differences that distinguish the account 210 from human user accounts also distinguish different human user accounts from one another, or the only kind of file system data structure 130 value differences that distinguish the account 210 from human user accounts also distinguish different human user accounts from one another (e.g., creation date, username).

In some embodiments, the method for classifying an account 210 includes:

submitting 502 sign-in data 218 to a trained machine learning model 224, the sign-in data representing at least one attempt 216 to sign-in to the account 210, the trained machine learning model tailored 226 for account classification 310 by at least one of the following: human-driven account 212 sign-in data 218, 228 which trained the machine learning model to detect machine-driven accounts 208 as anomalies 220, or machine-driven account 208 sign-in data 218, 228 which trained the machine learning model to detect human-driven accounts 212 as anomalies 220; receiving 504 from the trained machine learning model an anomaly detection result 222; formulating 506 an account classification 310 based at least in part on the anomaly detection result 222; and supplying 508 the account classification for use by a cybersecurity risk management mechanism 206, the cybersecurity risk management mechanism configured to manage a cybersecurity risk 204 associated with the account 210 based at least in part on the account classification 310. In this manner, some embodiments facilitate cybersecurity risk management 510, including for accounts 201 which were provisioned as human-driven 212 but are actually machine-driven 208 when classified 304.

In some embodiments, the submitting 502 or the formulating 506 or both are further characterized by utilization of at least a specified number N of the features 314, with N in the range from two to the total number of features 314 disclosed herein, depending on the embodiment.

Additional Observations

Additional support for the discussion of account classification herein is provided under various headings. However, it is all intended to be understood as an integrated and integral part of the present disclosure's discussion of the contemplated embodiments.

One of skill will recognize that not every part of this disclosure, or any particular details therein, are necessarily required to satisfy legal criteria such as enablement, written description, or best mode. Any apparent conflict with any other patent disclosure, even from the owner of the present innovations, has no role in interpreting the claims presented in this patent disclosure. With this understanding, which pertains to all parts of the present disclosure, additional examples and observations are offered.

Technical Character

The technical character of embodiments described herein will be apparent to one of ordinary skill in the art, and will also be apparent in several ways to a wide range of attentive readers. Some embodiments address technical activities such as logging 214 into a computer account 210, authenticating 428, 430, 432, etc. a login, training 226 a machine learning model 224 or 230, and calculating 308 an anomaly detection score 222, which are each an activity deeply rooted in computing technology. Some of the technical mechanisms discussed include, e.g., machine learning models 224, account classification software 306, security controls 316, risk management mechanisms 206, command line interpreters 426, credentials 438, and various indications 446. Some of the technical effects discussed include, e.g., identification 604 of account classification anomalies 220, improved security of machine-driven accounts 208 in comparison to security provided by tools or techniques that bundle machine-driven accounts 208 with human user accounts 212, and distinguishing 304 machine-driven accounts 208 which have been provisioned 602 as human-driven accounts 212. Thus, purely mental processes and activities limited to pen-and-paper are clearly excluded. Other advantages based on the technical characteristics of the teachings will also be apparent to one of skill from the description provided.

Some embodiments described herein may be viewed by some people in a broader context. For instance, concepts such as availability, awareness, ease, efficiency, or user satisfaction, may be deemed relevant to a particular embodiment. However, it does not follow from the availability of a broad context that exclusive rights are being sought herein for abstract ideas, they are not. Rather, the present disclosure is focused on providing appropriately specific embodiments whose technical effects fully or partially solve particular technical problems, such as how to automatically and effectively determine 304 whether an account 210 is machine-driven or human-driven regardless of how the account was initially provisioned 602. Other configured storage media, systems, and processes involving availability, awareness, ease, efficiency, or user satisfaction are outside the present scope. Accordingly, vagueness, mere abstractness, lack of technical character, and accompanying proof problems are also avoided under a proper understanding of the present disclosure.

Additional Combinations and Variations

Any of these combinations of code, data structures, logic, components, communications, and/or their functional equivalents may also be combined with any of the systems and their variations described above. A process may include any steps described herein in any subset or combination or sequence which is operable. Each variant may occur alone, or in combination with any one or more of the other variants. Each variant may occur with any of the processes and each process may be combined with any one or more of the other processes. Each process or combination of processes, including variants, may be combined with any of the configured storage medium combinations and variants described above.

More generally, one of skill will recognize that not every part of this disclosure, or any particular details therein, are necessarily required to satisfy legal criteria such as enablement, written description, or best mode. Also, embodiments are not limited to the particular motivating examples, operating environments, time period examples, software process flows, security tools, identifiers, data structures, data selections, naming conventions, notations, control flows, or other implementation choices described herein. Any apparent conflict with any other patent disclosure, even from the owner of the present innovations, has no role in interpreting the claims presented in this patent disclosure.

Some embodiments taught herein build upon Azure® Active Directory® Identity Protection capabilities (marks of Microsoft Corporation), or other identity and access management capabilities, as a foundation in detecting identity-based threats, by effectively expanding that foundation to include threat detection for service principals and other machine-driven accounts 208.

In some computing environments, a service principal is an account not related to any particular user 104. It is a concrete instantiation of an application 124, created in a tenant, and it inherits some properties from a global application object. The service principal object defines, e.g., what the app 124 can do in the specific tenant, who can access the app, and what resources 478 the app can access. Authentication with a service principal can be done through credentials which are either secrets 442 or certificates, for example. Multiple secrets or certificates can be added to a single service principal. Compromise happens when attackers are authenticated for access to the service principal by reusing existing credentials on a service principal, or by adding new credentials to the service principal, whereby the resources that can be accessed by the service principal will also be accessible to the attackers.

In some embodiments, device information, geo location, timestamp, and other data 218 are collected from service principal authentication request logs through Azure® Active Directory® Secure Token Service. Raw features of credentials of service principals are extracted from the raw logs and additional features (such as aggregated features) may also be added.

Some embodiments include a continually running portion and a runtime portion. The continually running portion includes a security token service which sends data for labeling and machine learning modeling, and from there sends data to an object ID labeled item. The runtime portion includes a user list sent to an app, e.g., via Microsoft Graph™ GET or the like, with the app sending tenant identifiers to the object ID labeled item. Labels travel from the object ID labeled item to the app, and feedback 492 as to label 310 accuracy goes back to the object ID labeled item. The user list is updated from the app, e.g., via Microsoft Graph™ POST or the like. Some embodiments apply heuristic rules to reduce false positive results from anomaly detection, heuristics may be applied during formulation 506. Other architectures may also be employed consistent with the account classification teachings herein.

Acronyms, Abbreviations, Names, and Symbols

Some acronyms, abbreviations, names, and symbols are defined below. Others are defined elsewhere herein, or do not require definition here in order to be understood by one of skill.

ALU: arithmetic and logic unit
API: application program interface
BIOS: basic input/output system
CD: compact disc
CPU: central processing unit
DVD: digital versatile disk or digital video disc
FPGA: field-programmable gate array
FPU: floating point processing unit
GPU: graphical processing unit
GUI: graphical user interface
GUID: globally unique identifier
HTTP(S): hypertext transfer protocol (secure)
IaaS or IAAS: infrastructure-as-a-service
ID: identification or identity
LAN: local area network
OS: operating system
PaaS or PAAS: platform-as-a-service
RAM: random access memory
ROM: read only memory
TPU: tensor processing unit
UA: user agent
UEFI: Unified Extensible Firmware Interface
WAN: wide area network Some Additional Terminology Reference is made herein to exemplary embodiments such as those illustrated in the drawings, and specific language is used herein to describe the same. But alterations and further modifications of the features illustrated herein, and additional technical applications of the abstract principles illustrated by particular embodiments herein, which would occur to one skilled in the relevant art(s) and having possession of this disclosure, should be considered within the scope of the claims.

The meaning of terms is clarified in this disclosure, so the claims should be read with careful attention to these clarifications. Specific examples are given, but those of skill in the relevant art(s) will understand that other examples may also fall within the meaning of the terms used, and within the scope of one or more claims. Terms do not necessarily have the same meaning here that they have in general usage (particularly in non-technical usage), or in the usage of a particular industry, or in a particular dictionary or set of dictionaries. Reference numerals may be used with various phrasings, to help show the breadth of a term. Omission of a reference numeral from a given piece of text does not necessarily mean that the content of a Figure is not being discussed by the text. The inventors assert and exercise the right to specific and chosen lexicography. Quoted terms are being defined explicitly, but a term may also be defined implicitly without using quotation marks. Terms may be defined, either explicitly or implicitly, here in the Detailed Description and/or elsewhere in the application file.

A "computer system" (a.k.a. "computing system") may include, for example, one or more servers, motherboards, processing nodes, laptops, tablets, personal computers (portable or not), personal digital assistants, smartphones, smartwatches, smartbands, cell or mobile phones, other mobile devices having at least a processor and a memory, video game systems, augmented reality systems, holographic projection systems, televisions, wearable computing systems, and/or other device(s) providing one or more processors controlled at least in part by instructions. The instructions may be in the form of firmware or other software in memory and/or specialized circuitry.

A "multithreaded" computer system is a computer system which supports multiple execution threads. The term "thread" should be understood to include code capable of or subject to scheduling, and possibly to synchronization. A thread may also be known outside this disclosure by another name, such as "task," "process," or "coroutine," for example. However, a distinction is made herein between threads and processes, in that a thread defines an execution path inside a process. Also, threads of a process share a given address space, whereas different processes have different respective address spaces. The threads of a process may run in parallel, in sequence, or in a combination of parallel execution and sequential execution (e.g., time-sliced).

A "processor" is a thread-processing unit, such as a core in a simultaneous multithreading implementation. A processor includes hardware. A given chip may hold one or more processors. Processors may be general purpose, or they may be tailored for specific uses such as vector processing, graphics processing, signal processing, floating-point arithmetic processing, encryption, I/O processing, machine learning, and so on.

"Kernels" include operating systems, hypervisors, virtual machines, BIOS or UEFI code, and similar hardware interface software.

"Code" means processor instructions, data (which includes constants, variables, and data structures), or both instructions and data. "Code" and "software" are used interchangeably herein. Executable code, interpreted code, and firmware are some examples of code.

"Program" is used broadly herein, to include applications, kernels, drivers, interrupt handlers, firmware, state machines, libraries, and other code written by programmers (who are also referred to as developers) and/or automatically generated.

A "routine" is a callable piece of code which normally returns control to an instruction just after the point in a program execution at which the routine was called. Depending on the terminology used, a distinction is sometimes made elsewhere between a "function" and a "procedure": a function normally returns a value, while a procedure does not. As used herein, "routine" includes both functions and procedures. A routine may have code that returns a value (e.g., sin(x)) or it may simply return without also providing a value (e.g., void functions).

"Service" means a consumable program offering, in a cloud computing environment or other network or computing system environment, which provides resources to multiple programs or provides resource access to multiple programs, or does both.

"Cloud" means pooled resources for computing, storage, and networking which are elastically available for measured on-demand service. A cloud may be private, public, community, or a hybrid, and cloud services may be offered in the form of infrastructure as a service (IaaS), platform as a service (PaaS), software as a service (SaaS), or another service. Unless stated otherwise, any discussion of reading from a file or writing to a file includes reading/writing a local file or reading/writing over a network, which may be a cloud network or other network, or doing both (local and networked read/write). A cloud may also be referred to as a "cloud environment" or a "cloud computing environment".

"Access" to a computational resource includes use of a permission or other capability to read, modify, write, execute, move, delete, create, or otherwise utilize the resource. Attempted access may be explicitly distinguished from actual access, but "access" without the "attempted" qualifier includes both attempted access and access actually performed or provided.

As used herein, "include" allows additional elements (i.e., includes means comprises) unless otherwise stated.

"Optimize" means to improve, not necessarily to perfect. For example, it may be possible to make further improvements in a program or an algorithm which has been optimized.

"Process" is sometimes used herein as a term of the computing science arts, and in that technical sense encompasses computational resource users, which may also include or be referred to as coroutines, threads, tasks, interrupt handlers, application processes, kernel processes, procedures, or object methods, for example. As a practical matter, a "process" is the computational entity identified by system utilities such as Windows® Task Manager, Linux® ps, or similar utilities in other operating system environments (marks of Microsoft Corporation, Linus Torvalds, respectively). "Process" is also used herein as a patent law term of art, e.g., in describing a process claim as opposed to a system claim or an article of manufacture (configured storage medium) claim. Similarly, "method" is used herein at times as a technical term in the computing science arts (a kind of "routine") and also as a patent law term of art (a "process"). "Process" and "method" in the patent law sense are used interchangeably herein. Those of skill will understand which meaning is intended in a particular instance, and will also understand that a given claimed process or method (in the patent law sense) may sometimes be implemented using one or more processes or methods (in the computing science sense).

"Automatically" means by use of automation (e.g., general purpose computing hardware configured by software for specific operations and technical effects discussed herein), as opposed to without automation. In particular, steps performed "automatically" are not performed by hand on paper or in a person's mind, although they may be initiated by a human person or guided interactively by a human person. Automatic steps are performed with a machine in order to obtain one or more technical effects that would not be realized without the technical interactions thus provided. Steps performed automatically are presumed to include at least one operation performed proactively.

One of skill understands that technical effects are the presumptive purpose of a technical embodiment. The mere fact that calculation is involved in an embodiment, for example, and that some calculations can also be performed without technical components (e.g., by paper and pencil, or even as mental steps) does not remove the presence of the technical effects or alter the concrete and technical nature of the embodiment, particularly in real-world embodiment implementations. Account classification operations such as training or invoking a machine learning model 224, logging or processing data 118 into features 314, calculating 308 an anomaly score 222, and many other operations discussed herein, are understood to be inherently digital. A human mind cannot interface directly with a CPU or other processor, or with RAM or other digital storage, to read and write the necessary data to perform the account classification steps taught herein even in a hypothetical prototype situation, much less in an embodiment's real world environment 100 that has thousands of daily login requests 216 and megabytes of daily sign-in data 218. This would all be well understood by persons of skill in the art in view of the present disclosure.

"Computationally" likewise means a computing device (processor plus memory, at least) is being used, and excludes obtaining a result by mere human thought or mere human action alone. For example, doing arithmetic with a paper and pencil is not doing arithmetic computationally as understood herein.

Computational results are faster, broader, deeper, more accurate, more consistent, more comprehensive, and/or otherwise provide technical effects that are beyond the scope of human performance alone. "Computational steps" are steps performed computationally. Neither "automatically" nor "computationally" necessarily means "immediately". "Computationally" and "automatically" are used interchangeably herein.

"Proactively" means without a direct request from a user. Indeed, a user may not even realize that a proactive step by an embodiment was possible until a result of the step has been presented to the user. Except as otherwise stated, any computational and/or automatic step described herein may also be done proactively.

"Based on" means based on at least, not based exclusively on. Thus, a calculation based on X depends on at least X, and may also depend on Y.

Throughout this document, use of the optional plural "(s)", "(es)", or "(ies)" means that one or more of the indicated features is present. For example, "processor(s)" means "one or more processors" or equivalently "at least one processor".

For the purposes of United States law and practice, use of the word "step" herein, in the claims or elsewhere, is not intended to invoke means-plus-function, step-plus-function, or 35 United State Code Section 112 Sixth Paragraph/Section 112(f) claim interpretation. Any presumption to that effect is hereby explicitly rebutted.

For the purposes of United States law and practice, the claims are not intended to invoke means-plus-function interpretation unless they use the phrase "means for". Claim language intended to be interpreted as means-plus-function language, if any, will expressly recite that intention by using the phrase "means for". When means-plus-function interpretation applies, whether by use of "means for" and/or by a court's legal construction of claim language, the means recited in the specification for a given noun or a given verb should be understood to be linked to the claim language and linked together herein by virtue of any of the following: appearance within the same block in a block diagram of the figures, denotation by the same or a similar name, denotation by the same reference numeral, a functional relationship depicted in any of the figures, a functional relationship noted in the present disclosure's text. For example, if a claim limitation recited a "zac widget" and that claim limitation became subject to means-plus-function interpretation, then at a minimum all structures identified anywhere in the specification in any figure block, paragraph, or example mentioning "zac widget", or tied together by any reference numeral assigned to a zac widget, or disclosed as having a functional relationship with the structure or operation of a zac widget, would be deemed part of the structures identified in the application for zac widgets and would help define the set of equivalents for zac widget structures.

One of skill will recognize that this innovation disclosure discusses various data values and data structures, and recognize that such items reside in a memory (RAM, disk, etc.), thereby configuring the memory. One of skill will also recognize that this innovation disclosure discusses various algorithmic steps which are to be embodied in executable code in a given implementation, and that such code also resides in memory, and that it effectively configures any general-purpose processor which executes it, thereby transforming it from a general-purpose processor to a special-purpose processor which is functionally special-purpose hardware.

Accordingly, one of skill would not make the mistake of treating as non-overlapping items (a) a memory recited in a claim, and (b) a data structure or data value or code recited in the claim. Data structures and data values and code are understood to reside in memory, even when a claim does not explicitly recite that residency for each and every data structure or data value or piece of code mentioned. Accordingly, explicit recitals of such residency are not required. However, they are also not prohibited, and one or two select recitals may be present for emphasis, without thereby excluding all the other data values and data structures and code from residency. Likewise, code functionality recited in a claim is understood to configure a processor, regardless of whether that configuring quality is explicitly recited in the claim.

Throughout this document, unless expressly stated otherwise any reference to a step in a process presumes that the step may be performed directly by a party of interest and/or performed indirectly by the party through intervening mechanisms and/or intervening entities, and still lie within the scope of the step. That is, direct performance of the step by the party of interest is not required unless direct performance is an expressly stated requirement. For example, a step involving action by a party of interest such as applying, authenticating, basing, calculating, detecting, determining, distinguishing, formulating, identifying, managing, measuring, provisioning, receiving, submitting, supplementing, supplying, tracking, training, (and applies, applied, authenticates, authenticated, etc.) with regard to a destination or other subject may involve intervening action such as the foregoing or forwarding, copying, uploading, downloading, encoding, decoding, compressing, decompressing, encrypting, decrypting, authenticating, invoking, and so on by some other party, including any action recited in this document, yet still be understood as being performed directly by the party of interest.

Whenever reference is made to data or instructions, it is understood that these items configure a computer-readable memory and/or computer-readable storage medium, thereby transforming it to a particular article, as opposed to simply existing on paper, in a person's mind, or as a mere signal being propagated on a wire, for example. For the purposes of patent protection in the United States, a memory or other computer-readable storage medium is not a propagating signal or a carrier wave or mere energy outside the scope of patentable subject matter under United States Patent and Trademark Office (USPTO) interpretation of the In re Nuijten case. No claim covers a signal per se or mere energy in the United States, and any claim interpretation that asserts otherwise in view of the present disclosure is unreasonable on its face. Unless expressly stated otherwise in a claim granted outside the United States, a claim does not cover a signal per se or mere energy.

Moreover, notwithstanding anything apparently to the contrary elsewhere herein, a clear distinction is to be understood between (a) computer readable storage media and computer readable memory, on the one hand, and (b) transmission media, also referred to as signal media, on the other hand. A transmission medium is a propagating signal or a carrier wave computer readable medium. By contrast, computer readable storage media and computer readable memory are not propagating signal or carrier wave computer readable media. Unless expressly stated otherwise in the claim, "computer readable medium" means a computer readable storage medium, not a propagating signal per se and not mere energy.

An "embodiment" herein is an example. The term "embodiment" is not interchangeable with "the invention". Embodiments may freely share or borrow aspects to create other embodiments (provided the result is operable), even if a resulting combination of aspects is not explicitly described per se herein. Requiring each and every permitted combination to be explicitly and individually described is unnecessary for one of skill in the art, and would be contrary to policies which recognize that patent specifications are written for readers who are skilled in the art. Formal combinatorial calculations and informal common intuition regarding the number of possible combinations arising from even a small number of combinable features will also indicate that a large number of aspect combinations exist for the aspects described herein. Accordingly, requiring an explicit recitation of each and every combination would be contrary to policies calling for patent specifications to be concise and for readers to be knowledgeable in the technical fields concerned.

LIST OF REFERENCE NUMERALS

The following list is provided for convenience and in support of the drawing figures and as part of the text of the specification, which describe innovations by reference to multiple items. Items not listed here may nonetheless be part of a given embodiment. For better legibility of the text, a given reference number is recited near some, but not all, recitations of the referenced item in the text. The same reference number may be used with reference to different examples or different instances of a given item. The list of reference numerals is:

100 operating environment, also referred to as computing environment
102 computer system, also referred to as a "computational system" or "computing system", and when in a network may be referred to as a "node"
104 users, e.g., user of an enhanced system 202; refers to a human or a human's online identity unless otherwise stated
106 peripherals
108 network generally, including, e.g., LANs, WANs, software-defined networks, clouds, and other wired or wireless networks
110 processor
112 computer-readable storage medium, e.g., RAM, hard disks
114 removable configured computer-readable storage medium
116 instructions executable with processor; may be on removable storage media or in other memory (volatile or nonvolatile or both)
118 data
120 kernel(s), e.g., operating system(s), BIOS, UEFI, device drivers
122 tools, e.g., anti-virus software, firewalls, packet sniffer software, intrusion detection systems, intrusion prevention systems, other cybersecurity tools, debuggers, profilers, compilers, interpreters, decompilers, assemblers, disassemblers, source code editors, autocompletion software, simulators, fuzzers, repository access tools, version control tools, optimizers, collaboration tools, other software development tools and tool suites (including, e.g., integrated development environments), hardware development tools and tool suites, diagnostics, and so on 124 applications, e.g., word processors, web browsers, spreadsheets, games, email tools, commands 126 display screens, also referred to as "displays"

128 computing hardware not otherwise associated with a reference number 106, 108, 110, 112, 114

130 file, blob, table, container, or other digital storage unit(s); also refers to file systems and similar storage systems (blob systems, etc.), and to data structures used in such storage systems 132 browser, a.k.a. web browser; software 134 cloud; software and hardware 136 computational service, e.g., storage service, kernel service, communications service, provisioning service, monitoring service, daemon, interrupt handler, networking service, virtualization service, identity service, etc.

202 system 102 enhanced with account classification functionality 302

204 security risk, e.g., a risk to confidentiality, integrity, or availability of data or of a resource in a computing system 102

206 security risk management mechanism, e.g., identity and access management software, intrusion detection or prevention software, exfiltration prevention software, role-based access control software, authentication or authorization software, other cybersecurity software 208 machine-driven account, e.g., account operated principally or solely on behalf of a service 136 or an application identity, as opposed to human user identity or human user account identity; 208 also refers to the account characteristic or status of being machine-driven; digital or computational or both; application identity accounts operate mostly or entirely to provide services with access to resources, as opposed to human identity accounts which operate mostly or entirely on behalf of a particular person ("mostly or entirely" may be quantified, e.g., by logins, resource usage, or express categorization on account creation); some examples include Microsoft® application service principals (mark of Microsoft Corporation), Amazon Web Services® Identity Access Management Roles (mark of Amazon Technologies, Inc.), Google® service account identities (mark of Google, LLC)

210 computing environment account; may be known to be machine-driven or known to be human-driven or be of indeterminate status 212 human-driven account, as opposed to machine-driven account; 212 also refers to the account characteristic or status of being human-driven; digital or computational or both 214 sign-in activity; computational; may also be referred to as "login", "logon", or "sign-on", for example; includes receipt of one or more credentials 438

216 sign-in attempt, e.g., attempt to sign-in to an account 210; includes successful and unsuccessful attempts unless otherwise indicated 218 digital data representing one or more sign-in attempts 220 anomaly, as identified by a machine learning model; digital 222 anomaly detection result, e.g., anomaly score (a.k.a. anomalousness score or classification or prediction); an anomaly score may be Boolean, or a non-negative integer, or a value in a range from 0.0 to 1.0, for example; in addition to an anomaly score, an anomaly detection result may in some embodiments include an explanation of the basis for the score, e.g., by stating which feature(s) 314 are outliers 224 machine learning model; computational 226 computationally training a machine learning model 228 training data for training a machine learning model 224 or 230

230 precursor machine learning model; computational 302 account classification functionality, e.g., functionality which performs at least steps 308, 504, 506, 604, 606, 608, or 612 pursuant to classifying an account 210 as machine-driven or human-driven, or a trained 226 model 224, or an implementation providing functionality for any previously unknown method or previously unknown data structure shown in any Figure of the present disclosure 304 computationally classifying an account 210 as machine-driven or human-driven 306 account classification software, e.g., software which performs any method according to any of the Figures herein or utilizes any data structure according to any of the Figures herein in a manner that facilitates classifying an account 210 as machine-driven or human-driven 308 detection of an account as anomalous or as non-anomalous; performed computationally using a trained machine learning model 310 classification of an account as machine-driven or human-driven; digital value; in some embodiments may also encompass "indeterminate" status when machine-driven or human-driven status is not known 312 cybersecurity risk management, e.g., identification, avoidance, mitigation, transference, or limitation of a risk 204; performed computationally at least in part 314 feature; digital; e.g., data used to train 226 a model 224 or submitted 502 to a model 224

316 security control, e.g., tools, tactics, or other safeguards or countermeasures to computationally avoid, detect, limit, recover from, or otherwise mitigate impact from accidental or intentional threats to availability, confidentiality, integrity, privacy, or other valued aspects of an account 210 or a resource 478

318 interface generally to a system 102 or portion thereof; may include, e.g., shells, graphical or other user interfaces, network addresses, APIs, network interface cards, ports 402 autonomous system; part of the global IP address infrastructure 404 autonomous system number (ASN); digital 406 source of sign-in attempt, as represented by one or more digital values, e.g., IP address, ASN, user agent, etc.

408 kind of IP, namely, hosted or non-hosted (residential)

410 digital indication of kind 408; may be explicit (e.g., bit set for hosted and clear for non-hosted) or implicit in IP address or ASN; an example of indications 446

412 hosted IP address(es); also refers to state of being hosted; digital; e.g., IP address provided via Amazon Web Services®, Microsoft Azure®, Google® Cloud Platform, etc. (marks of their respective owners)

414 residential IP address(es); also refers to state of being residential; digital; e.g., IP address provided by an Internet Service Provider to a residential customer 416 operating system or other kernel identifier; digital
418 number of operating system(s) or other kernel(s); digital
420 managed device 102, e.g., a device 102 under organizational control, e.g., via Microsoft System Center Configuration Manager™ software, Microsoft Endpoint Configuration Manager™ software, or mobile device management software
422 user agent in a network communication, e.g., HTTP or HTTPS communications; represented digitally
424 mobile device, e.g., smartphone, laptop, tablet, smart watch, or other networked computing device suitable to be routinely moved by a person
426 command line interpreter, e.g., textual interface to an application or operating system, as opposed to graphical user interface; also referred to as "command line interface"; computational
428 authentication event based on biometric data as a credential, e.g., fingerprint, face recognition, voiceprint, iris pattern, or other characteristic specific to ten or fewer humans; 428 also refers to biometric data
430 authentication event based on multiple factors as credentials, e.g., a password plus biometric data, or a password plus a hardware key 432, or a reusable password plus a one-time password sent to a mobile device; also called "multifactor authentication" or "MFA"; 430 also refers to MFA data
432 authentication event based on a removable hardware key as a credential; 432 also refers to removable hardware key credential data; may be compliant, e.g., with a FIDO® standard (mark of FIDO Alliance)
434 error code; digital
436 random forest algorithm or computational implementation thereof
438 authentication credential; digital; may also be referred to as a "key" especially when the credential includes or is secured by an encryption key
440 type of credential, e.g., secret such as a password or encryption key, or non-secret such as a digital certificate or security token; digital; an example indication 446
442 password or passphrase, or hash thereof; digital
444 isolation forest algorithm or computational implementation thereof
446 indication generally; digital value—presence or absence of any item in FIG. 4, for example, may be represented digitally by an indication, some FIG. 4 items also have a physical manifestation, e.g., a hardware key or a managed device, whereas other items have only a digital manifestation, e.g., an error code or a timestamp
448 time period; digital; may be represented, e.g., as a start time and an end time, or as a start time and a subsequent duration, or as an end time and a preceding duration; may measure fractions of a second, or greater units such as minutes, hours, days, or weeks, depending on the particular context
450 timestamp; digital; represents a particular point in time (wall clock time, or internal system time)
452 variation in a set of timestamps; digital; may be represented as a distribution, average, or other statistical measure
454 unlabeled training data 118 for training a machine learning model via unsupervised training
456 labeled training data 118 for training a machine learning model via supervised training
458 active days, e.g., which days or how many days sign-in attempts were made to an account
460 digital representation of active days 458; an example of an indication 446
462 directory containing digital identity information
464 entry in a directory 462, e.g., information pertaining to a particular identity; digital
466 contact information in an entry 464; digital
468 employee information in an entry 464; digital; note that a particular data item listed herein as contact info may be categorized in some directories as employee info, and vice versa
470 attempt consistency measure; digital; representation of consistency of a set of sign-in attempts; may include a distribution, average, or other statistical measure
472 login session, e.g., period of access to an account after successful sign-in
474 session length; period 448 pertaining to a login session
476 sign-in attempt success measure; digital; representation of success or failure of a set of sign-in attempts; may include a distribution, average, or other statistical measure
478 resource, e.g., file, data structure, virtual machine, or other digital artifact, application 124, kernel 120, portion of memory 112, processor 110, display 126 or peripheral 106 or other hardware 128
480 number of resources 478
482 IP address (IPv4 or IPv6); digital
484 threshold generally; digital
486 metadata generally; digital
488 convention for naming accounts, usernames, resources, or other items in an environment 100; may specify a syntax pattern or a consistency between certain item names, for example
490 access right, a.k.a. "permission"; typically specifies some limit on access to a resource
492 indication of classification accuracy, usable, e.g., as feedback to further train a model; digital data
500 flowchart; 500 also refers to account classification methods illustrated by or consistent with the FIG. 5 flowchart
502 computationally submit sign-in data to a trained model, e.g., via an API, as part of account classification 304
504 computationally receive an anomaly detection result, e.g., via an API, as part of account classification 304
506 computationally formulate an account classification 310
508 computationally supply an account classification 310 to a risk management mechanism, e.g., via an API
510 computationally manage a cybersecurity risk
600 flowchart; 600 also refers to account classification methods illustrated by or consistent with the FIG. 6 flowchart (which incorporates the steps of FIG. 5)
602 computationally provision an account 210
604 computationally identify an account as anomalous or as non-anomalous as part of account classification 304; note that a machine-driven account would be identified as anomalous by a model trained on human-driven account features and would be identified as non-anomalous by a model trained on machine-driven account features
606 computationally perform supervised training of a machine learning model to facilitate account classification 304

608 computationally perform unsupervised training of a machine learning model to facilitate account classification 304

610 computationally use precursor model 230 output as training 226 data when training 606, 226 a model 224

612 computationally supplement an anomaly detection result 222, e.g., by using as a factor the absence or presence of directory info 466 or 468; note that absence or presence may be determined regardless of whether directory info 466 or 468 is hashed, encrypted, or otherwise indecipherable; supplementing 612 may also be referred to as applying a heuristic to improve classification accuracy 614 computationally base an account classification 310 on particular feature 314 data 616 computationally apply a security control to an account 210 based on an account classification 310 of that account 618 any step discussed in the present disclosure that has not been assigned some other reference numeral

CONCLUSION

In short, the teachings herein provide a variety of account classification functionalities 302 which operate in enhanced systems 202. Some embodiments improve the security of service principals, service accounts, other application identity accounts, and other machine-driven accounts 208 by distinguishing machine-driven accounts from human-driven accounts even when a machine-driven account has been provisioned 602 as a human-driven account. A trained machine learning model 224 distinguishes between human-driven accounts 212 and machine-driven accounts 208 by performing anomaly detection 308 based on sign-in data attempt 218. This machine versus human distinction supports security improvements that apply 510 security controls 316 and other risk management tools 206 and techniques which are specifically tailored to the kind of account 210 being secured. Formulation 506 heuristics can improve account classification 310 accuracy by supplementing 612 a machine learning model anomaly detection result 222, e.g., based on directory 462 information 464, kind 408 of IP address 482, kind of authentication 428 or 430 or 432 or 440, or various sign-in source 406 characteristics 446, 314. Machine-driven accounts 208 masquerading 602 as human-driven 212 may be identified 304 as machine-driven 208. A precursor machine learning model 230 may generate training data 228 for training 226 a production account classification machine learning model 224. Other aspects of account classification functionality 302, and its technical advantages, are also described herein.

Embodiments are understood to also themselves include or benefit from tested and appropriate security controls and privacy controls such as the General Data Protection Regulation (GDPR), e.g., it is understood that appropriate measures should be taken to help prevent misuse of computing systems through the injection or activation of malware in documents. Use of the tools and techniques taught herein is compatible with use of such controls.

Although Microsoft technology is used in some motivating examples, the teachings herein are not limited to use in technology supplied or administered by Microsoft. Under a suitable license, for example, the present teachings could be embodied in software or services provided by other cloud service providers.

Although particular embodiments are expressly illustrated and described herein as processes, as configured storage media, or as systems, it will be appreciated that discussion of one type of embodiment also generally extends to other embodiment types. For instance, the descriptions of processes in connection with FIGS. 7 to 15 also help describe configured storage media, and help describe the technical effects and operation of systems and manufactures like those discussed in connection with other Figures. It does not follow that limitations from one embodiment are necessarily read into another. In particular, processes are not necessarily limited to the data structures and arrangements presented while discussing systems or manufactures such as configured memories.

Those of skill will understand that implementation details may pertain to specific code, such as specific thresholds, comparisons, specific kinds of runtimes or programming languages or architectures, specific scripts or other tasks, and specific computing environments, and thus need not appear in every embodiment. Those of skill will also understand that program identifiers and some other terminology used in discussing details are implementation-specific and thus need not pertain to every embodiment. Nonetheless, although they are not necessarily required to be present here, such details may help some readers by providing context and/or may illustrate a few of the many possible implementations of the technology discussed herein.

With due attention to the items provided herein, including technical processes, technical effects, technical mechanisms, and technical details which are illustrative but not comprehensive of all claimed or claimable embodiments, one of skill will understand that the present disclosure and the embodiments described herein are not directed to subject matter outside the technical arts, or to any idea of itself such as a principal or original cause or motive, or to a mere result per se, or to a mental process or mental steps, or to a business method or prevalent economic practice, or to a mere method of organizing human activities, or to a law of nature per se, or to a naturally occurring thing or process, or to a living thing or part of a living thing, or to a mathematical formula per se, or to isolated software per se, or to a merely conventional computer, or to anything wholly imperceptible or any abstract idea per se, or to insignificant post-solution activities, or to any method implemented entirely on an unspecified apparatus, or to any method that fails to produce results that are useful and concrete, or to any preemption of all fields of usage, or to any other subject matter which is ineligible for patent protection under the laws of the jurisdiction in which such protection is sought or is being licensed or enforced.

Reference herein to an embodiment having some feature X and reference elsewhere herein to an embodiment having some feature Y does not exclude from this disclosure embodiments which have both feature X and feature Y, unless such exclusion is expressly stated herein. All possible negative claim limitations are within the scope of this disclosure, in the sense that any feature which is stated to be part of an embodiment may also be expressly removed from inclusion in another embodiment, even if that specific exclusion is not given in any example herein. The term "embodiment" is merely used herein as a more convenient form of "process, system, article of manufacture, configured computer readable storage medium, and/or other example of the teachings herein as applied in a manner consistent with applicable law." Accordingly, a given "embodiment" may include any combination of features disclosed herein, provided the embodiment is consistent with at least one claim.

Not every item shown in the Figures need be present in every embodiment. Conversely, an embodiment may contain item(s) not shown expressly in the Figures. Although some possibilities are illustrated here in text and drawings by specific examples, embodiments may depart from these examples. For instance, specific technical effects or technical features of an example may be omitted, renamed, grouped differently, repeated, instantiated in hardware and/or software differently, or be a mix of effects or features appearing in two or more of the examples. Functionality shown at one location may also be provided at a different location in some embodiments; one of skill recognizes that functionality modules can be defined in various ways in a given implementation without necessarily omitting desired technical effects from the collection of interacting modules viewed as a whole. Distinct steps may be shown together in a single box in the Figures, due to space limitations or for convenience, but nonetheless be separately performable, e.g., one may be performed without the other in a given performance of a method.

Reference has been made to the figures throughout by reference numerals. Any apparent inconsistencies in the phrasing associated with a given reference numeral, in the figures or in the text, should be understood as simply broadening the scope of what is referenced by that numeral. Different instances of a given reference numeral may refer to different embodiments, even though the same reference numeral is used. Similarly, a given reference numeral may be used to refer to a verb, a noun, and/or to corresponding instances of each, e.g., a processor 110 may process 110 instructions by executing them.

As used herein, terms such as "a", "an", and "the" are inclusive of one or more of the indicated item or step. In particular, in the claims a reference to an item generally means at least one such item is present and a reference to a step means at least one instance of the step is performed. Similarly, "is" and other singular verb forms should be understood to encompass the possibility of "are" and other plural forms, when context permits, to avoid grammatical errors or misunderstandings.

Headings are for convenience only, information on a given topic may be found outside the section whose heading indicates that topic.

All claims and the abstract, as filed, are part of the specification.

To the extent any term used herein implicates or otherwise refers to an industry standard, and to the extent that applicable law requires identification of a particular version of such as standard, this disclosure shall be understood to refer to the most recent version of that standard which has been published in at least draft form (final form takes precedence if more recent) as of the earliest priority date of the present disclosure under applicable patent law.

While exemplary embodiments have been shown in the drawings and described above, it will be apparent to those of ordinary skill in the art that numerous modifications can be made without departing from the principles and concepts set forth in the claims, and that such modifications need not encompass an entire abstract concept. Although the subject matter is described in language specific to structural features and/or procedural acts, it is to be understood that the subject matter defined in the appended claims is not necessarily limited to the specific technical features or acts described above the claims. It is not necessary for every means or aspect or technical effect identified in a given definition or example to be present or to be utilized in every embodiment. Rather, the specific features and acts and effects described are disclosed as examples for consideration when implementing the claims.

All changes which fall short of enveloping an entire abstract idea but come within the meaning and range of equivalency of the claims are to be embraced within their scope to the full extent permitted by law.

What is claimed is:

1. A computing system configured to classify an account in a computing environment as machine-driven or as human-driven, the computing system comprising:
   a digital memory;
   a processor in operable communication with the digital memory, the processor configured to perform account classification steps including (a) submitting sign-in data to a trained machine learning model, the sign-in data representing at least one attempt to sign-in to the account, the trained machine learning model tailored for account classification by at least one of the following: human-driven account sign-in data which trained the machine learning model to detect machine-driven accounts as anomalies, or machine-driven account sign-in data which trained the machine learning model to detect human-driven accounts as anomalies, (b) receiving from the trained machine learning model an anomaly detection result, (c) formulating an account classification based at least in part on the anomaly detection result, and (d) supplying the account classification for use by a cybersecurity risk management mechanism, the cybersecurity risk management mechanism configured to manage a cybersecurity risk associated with the account based at least in part on the account classification, thereby improving security by distinguishing the machine-driven accounts from the human-driven accounts;
   wherein the trained machine learning model is tailored for account classification which classifies the account as a machine-driven account or a human-driven account at least in that the trained machine learning model has been trained to perform the account classification, and thereby configured, using training data which includes, represents, or is a calculation basis of at least three of:
   an indication whether an IP address of a source of a sign-in attempt is hosted or residential;
   an indication whether an autonomous system number of a source of a sign-in attempt represents hosted IPs or residential IPs;
   an indication whether a source of a sign-in attempt is a browser; an indication whether a source of a sign-in attempt is a command line interpreter;
   an indication whether a source of a sign-in attempt resides on a mobile device;
   an indication whether a source of a sign-in attempt resides on an organizationally managed device;
   an indication whether a sign-in attempt included or followed a successful multifactor authentication;
   an indication whether a sign-in attempt included or followed a successful biometric authentication;
   an indication whether a sign-in attempt included or followed a successful removable hardware security key device authentication;
   an indication of which one or more operating systems are present on a source of a sign-in attempt;
   an indication of how many operating systems are present on a source of a sign-in attempt; or an error code generated in response to the sign-in attempt.

2. The computing system of claim 1, further comprising the trained machine learning model.

3. The computing system of claim 2, wherein the trained machine learning model is tailored for account classification by at least a random forest algorithm implementation.

4. The computing system of claim 1, wherein the trained machine learning model is tailored for account classification at least in that the trained machine learning model has been trained and thereby configured using training data which includes, represents, or is a calculation basis of at least four of the following features:
- an indication whether an IP address of a source of a sign-in attempt is hosted or residential;
- an indication whether an autonomous system number of a source of a sign-in attempt represents hosted IPs or residential IPs;
- an indication whether a source of a sign-in attempt is a browser;
- an indication whether a source of a sign-in attempt is a command line interpreter;
- an indication whether a source of a sign-in attempt resides on a mobile device;
- an indication whether a source of a sign-in attempt resides on an organizationally managed device;
- an indication whether a sign-in attempt included or followed a successful multifactor authentication;
- an indication whether a sign-in attempt included or followed a successful biometric authentication;
- an indication whether a sign-in attempt included or followed a successful removable hardware security key device authentication;
- an indication of which one or more operating systems are present on a source of a sign-in attempt;
- an indication of how many operating systems are present on a source of a sign-in attempt; or
- an error code generated in response to the sign-in attempt.

5. The computing system of claim 1, wherein the trained machine learning model is tailored for account classification at least in that the trained machine learning model has been trained and thereby configured using training data which includes, represents, or is a calculation basis of at least two of the following features:
- a sign-in attempt success measure of a source of a sign-in attempt;
- an indication of an extent to which timestamps of respective sign-in attempts vary over a period of at least five days;
- a signed-in duration indicating a length of a session after a successful sign-in attempt;
- an active days indication, which indicates on how many consecutive days a successful sign-in attempt occurred, or indicates on which days a successful sign-in attempt occurred, or both;
- an allocated resources count indicating how many resources are allocated to the account;
- an indication whether a directory entry for the account includes contact information;
- an indication whether a directory entry for the account includes employee information; or
- a label accuracy feedback.

6. A method for classifying an account in a computing environment as machine-driven or as human-driven, the method performed by a computing system, the method comprising:
- submitting sign-in data to a trained machine learning model, the sign-in data representing at least one attempt to sign-in to the account, the trained machine learning model tailored for account classification by at least one of the following: human-driven account sign-in data which trained the machine learning model to detect machine-driven accounts as anomalies, or machine-driven account sign-in data which trained the machine learning model to detect human-driven accounts as anomalies;
- receiving from the trained machine learning model an anomaly detection result;
- formulating an account classification based at least in part on the anomaly detection result;
- supplying the account classification for use by a cybersecurity risk management mechanism, the cybersecurity risk management mechanism configured to manage a cybersecurity risk associated with the account based at least in part on the account classification, thereby improving security by distinguishing the machine-driven accounts from the human-driven accounts; and
- wherein the trained machine learning model is tailored for account classification at least in that the trained machine learning model has been trained and thereby configured using training data which includes, represents, or is a calculation basis of at least two of:
  - a sign-in attempt success measure of a source of a sign-in attempt;
  - an indication of an extent to which timestamps of respective sign-in attempts vary over a period of at least five days;
  - a signed-in duration indicating a length of a session after a successful sign-in attempt;
  - an active days indication, which indicates on how many consecutive days a successful sign-in attempt occurred, or indicates on which days a successful sign-in attempt occurred, or both;
  - an allocated resources count indicating how many resources are allocated to the account;
  - an indication whether a directory entry for the account includes contact information; an indication whether a directory entry for the account includes employee information; or
  - a label accuracy feedback.

7. The method of claim 6, further comprising at least one of the following:
- training the machine learning model using human-driven account sign-in data, and wherein the anomaly detection result identifies the account as anomalous, and wherein the account classification classifies the account as machine-driven even though the account was provisioned as human-driven; or
- training the machine learning model using machine-driven account sign-in data, and wherein the anomaly detection result identifies the account as non-anomalous, and wherein the account classification classifies the account as machine-driven even though the account was provisioned as human-driven.

8. The method of claim 6, wherein formulating the account classification includes supplementing the anomaly detection result with at least one of the following:
- an indication whether a directory entry for the account includes contact information; or
- an indication whether a directory entry for the account includes employee information.

9. The method of claim 6, further characterized in at least one of the following ways:
- submitting sign-in data includes submitting at least an indication whether an IP address of a source of the sign-in attempt is hosted or residential; or formulating the account classification includes basing the account classification on at least an indication whether an IP address of a source of the sign-in attempt is hosted or residential.

10. The method of claim 6, further characterized in at least one of the following ways:
submitting sign-in data includes submitting at least an indication whether the sign-in attempt presented a password as an authentication credential; or
formulating the account classification includes basing the account classification on at least an indication whether the sign-in attempt presented a password as an authentication credential.

11. The method of claim 6, further characterized in at least one of the following ways:
submitting sign-in data includes submitting at least an indication whether the sign-in attempt included or followed a successful biometric authentication;
submitting sign-in data includes submitting at least an indication whether the sign-in attempt included or followed a successful removable hardware security key device authentication;
formulating the account classification includes basing the account classification on at least an indication whether the sign-in attempt included or followed a successful biometric authentication; or
formulating the account classification includes basing the account classification on at least an indication whether the sign-in attempt included or followed a successful removable hardware security key device authentication.

12. The method of claim 6, further characterized in at least one of the following ways:
submitting sign-in data includes submitting at least an indication whether a source of the sign-in attempt is a browser; or
formulating the account classification includes basing the account classification on at least an indication whether a source of the sign-in attempt is a browser.

13. The method of claim 6, further characterized in at least one of the following ways:
submitting sign-in data includes submitting at least a sign-in attempt consistency measure; or
formulating the account classification includes basing the account classification on at least a sign-in attempt consistency measure.

14. The method of claim 6, wherein the account classification classifies the account as machine-driven, and the cybersecurity risk management mechanism applies a different security control to the account than the cybersecurity risk management mechanism applies to human-driven accounts.

15. The method of claim 6, further comprising:
training a precursor machine learning model using unlabeled sign-in training data and unsupervised training;
training the trained machine learning model for account classification using supervised training and using output from the precursor machine learning model as labeled training data.

16. A computer-readable storage device configured with data and instructions which upon execution by a processor cause a computing system to perform a method for classifying an account in a computing environment as machine-driven or as human-driven, the account provisioned as human-driven but not necessarily human-driven in operation, the method comprising:
submitting sign-in data to a trained machine learning model, the sign-in data representing at least one attempt to sign-in to the account, the trained machine learning model tailored for account classification by at least one of the following: human-driven account sign-in data which trained the machine learning model to detect machine-driven accounts as anomalies, or machine-driven account sign-in data which trained the machine learning model to detect human-driven accounts as anomalies;
receiving from the trained machine learning model an anomaly detection result;
formulating an account classification based at least in part on the anomaly detection result; and
supplying the account classification for use by a cybersecurity risk management mechanism, the cybersecurity risk management mechanism configured to manage a cybersecurity risk associated with the account based at least in part on the account classification, thereby improving security by distinguishing the machine-driven accounts from the human-driven accounts;
whereby the method facilitates cybersecurity risk management for accounts which were provisioned as human-driven but are actually machine-driven; and
wherein the submitting or the formulating or both are further characterized by utilization of at least four of:
a sign-in attempt success measure of a source of a sign-in attempt; an indication of an extent to which timestamps of respective sign-in attempts vary over a period of at least one week;
a signed-in duration indicating a length of a session after a successful sign-in attempt; an active days indication, which indicates on how many consecutive days a successful sign-in attempt occurred, or indicates on which days a successful sign-in attempt occurred, or both;
an allocated resources count indicating how many resources are allocated to the account;
an indication whether a directory entry for the account includes contact information; an indication whether a directory entry for the account includes employee information;
an indication whether an IP address of a source of a sign-in attempt is hosted or residential;
an indication whether an autonomous system number of a source of a sign-in attempt represents hosted IPs or residential IPs;
an indication whether a source of a sign-in attempt is a browser; an indication whether a source of a sign-in attempt is a command line interpreter;
an indication whether a source of a sign-in attempt resides on a mobile device;
an indication whether a source of a sign-in attempt resides on an organizationally managed device;
an indication whether a sign-in attempt included or followed a successful multifactor authentication;
an indication whether a sign-in attempt included or followed a successful biometric authentication;
an indication whether a sign-in attempt included or followed a successful removable hardware security key device authentication;
an indication of which one or more operating systems are present on a source of a sign-in attempt; or
an indication of how many operating systems are present on a source of a sign-in attempt; or an error code generated in response to the sign-in attempt.

17. The computer-readable storage device of claim 16, wherein the submitting or the formulating or both are further characterized by utilization of at least five of the following features:

- a sign-in attempt success measure of a source of a sign-in attempt;
- an indication of an extent to which timestamps of respective sign-in attempts vary over a period of at least one week;
- a signed-in duration indicating a length of a session after a successful sign-in attempt;
- an active days indication, which indicates on how many consecutive days a successful sign-in attempt occurred, or indicates on which days a successful sign-in attempt occurred, or both;
- an allocated resources count indicating how many resources are allocated to the account;
- an indication whether a directory entry for the account includes contact information;
- an indication whether a directory entry for the account includes employee information;
- an indication whether an IP address of a source of a sign-in attempt is hosted or residential;
- an indication whether an autonomous system number of a source of a sign-in attempt represents hosted IPs or residential IPs;
- an indication whether a source of a sign-in attempt is a browser;
- an indication whether a source of a sign-in attempt is a command line interpreter;
- an indication whether a source of a sign-in attempt resides on a mobile device;
- an indication whether a source of a sign-in attempt resides on an organizationally managed device;
- an indication whether a sign-in attempt included or followed a successful multifactor authentication;
- an indication whether a sign-in attempt included or followed a successful biometric authentication;
- an indication whether a sign-in attempt included or followed a successful removable hardware security key device authentication;
- an indication of which one or more operating systems are present on a source of a sign-in attempt; or
- an indication of how many operating systems are present on a source of a sign-in attempt; or
- an error code generated in response to the sign-in attempt.

18. The computer-readable storage device of claim 17, wherein the submitting or the formulating or both are further characterized by utilization of at least six of the features.

19. The computer-readable storage device of claim 17, wherein the submitting or the formulating or both are further characterized by utilization of at least eight of the features.

20. The computer-readable storage device of claim 17, wherein the submitting or the formulating or both are further characterized by utilization of at least ten of the features.

* * * * *